(12) United States Patent
Adewunmi et al.

(10) Patent No.: US 11,123,658 B2
(45) Date of Patent: Sep. 21, 2021

(54) DEMULSIFICATION METHODS USING PALM OIL FUEL ASH

(71) Applicant: King Fahd University of Petroleum and Minerals, Dhahran (SA)

(72) Inventors: Ahmad A. Adewunmi, Dhahran (SA); Muhammad Shahzad Kamal, Dhahran (SA); Theis Ivan Solling, Dhahran (SA); Babatunde Abiodun Salami, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/416,774

(22) Filed: May 20, 2019

(65) Prior Publication Data
US 2020/0368640 A1    Nov. 26, 2020

(51) Int. Cl.
*B01D 17/04* (2006.01)
*B01D 17/02* (2006.01)
*C10G 33/04* (2006.01)

(52) U.S. Cl.
CPC ....... *B01D 17/047* (2013.01); *B01D 17/0214* (2013.01); *C10G 33/04* (2013.01)

(58) Field of Classification Search
CPC .............. B01D 17/047; B01D 17/0214; C02F 2101/32
USPC ..................................................... 210/708
See application file for complete search history.

(56) References Cited

U.S. PATENT DOCUMENTS

| 2,745,855 A | 5/1956 | Case |
| 2,907,717 A * | 10/1959 | Hann ............... C10G 33/04 516/136 |
| 6,310,106 B1 | 10/2001 | Podubrin et al. |
| 9,695,366 B2 | 7/2017 | Bevinakatti et al. |
| 2017/0203235 A1 | 7/2017 | Fleischhaker |
| 2018/0327653 A1 * | 11/2018 | Palla-Venkata ........ C09K 8/602 |

FOREIGN PATENT DOCUMENTS

CN    101544903 B    7/2012

OTHER PUBLICATIONS

M S Imla Syafiqah and H W Yussof 2018 IOP Conf. Ser.: Mater. Sci. Eng. 334 012039, "Adsorption of mercury from aqueous solutions using palm oil fuel ash as an adsorbent—batch studies", pp. 1-9 (Year: 2018).*

Adewunmi et al, "Assessment of Fly Ash as a Potential Demulsifier for Highly Stable Water-in-Crude Oil Emulsion Produced in the Petroleum Industry," Society of Petroleum Engineers, SPE-192364-MS, pp. 1-18 (Year: 2018).*

(Continued)

*Primary Examiner* — Claire A Norris
(74) *Attorney, Agent, or Firm* — Oblon, McClelland, Maier & Neustadt, L.L.P.

(57) ABSTRACT

A method of demulsifying an emulsion of oil and water whereby palm oil fuel ash, which is a low cost waster product obtained from oil palm processing, is added to the emulsion and the resulting mixture is agitated, thereby breaking the emulsion into an aqueous phase and an oil phase. Solid particles of palm oil fuel ash settle to the bottom of the aqueous phase, allowing easy separation of the oil phase, the aqueous phase, and the settled solid particles of palm oil fuel ash.

19 Claims, 14 Drawing Sheets

(56) References Cited

OTHER PUBLICATIONS

Tai, et al.; Low cost palm oil fuel ash based ceramic membranes for oily water separation; Malaysian Journal of Fundamental and Applied Sciences vol. 14, No. 4; pp. 419-424; Dec. 3, 2018; 6 Pages.

Hambali, et al.; Palm oil anionic surfactants based emulsion breaker (Case study of emulsions breaker at Semanggi Field production wells); International Conferences on Biomass: Technology, Application, and Sustainable Development; 2017; 10 Pages.

Fui; Stability and Chemical Demulsification of Water-in-Crude Oil Emulsions (Chemical Method); Thesis; Dec. 2009; 26 Pages.

Nuraini, et al.; Effect of chemical breaking agents on water-in-crude oil emulsion system; International Journal of Chemical and Environmental Engineering, vol. 2, No. 4; Aug. 2011; 5 pages.

* cited by examiner

DEMULSIFICATION METHODS USING PALM OIL FUEL ASH

BACKGROUND OF THE INVENTION

Field of the Invention

The present invention relates to methods of demulsifying an oil and water emulsion with palm oil fuel ash.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Effective, cheap, and recyclable materials to demulsify crude oil emulsions are greatly desired in the petroleum industry. Highly stable emulsions are routinely encountered during crude oil production causing various environmental and operational challenges. Crude oil and water are immiscible fluids and often form very stable emulsions owing to the presence of surface-active materials at the water/oil interface and the presence of fine solid particles. Either oil-in-water (O/W) or water-in-oil (W/O) emulsions are produced during oil exploration. See Shehzad, F., Hussein, I. A., Kamal, M. S., Ahmad, W., Sultan, A. S., Nasser, M. S., 2017, Polymeric Surfactants and Emerging Alternatives used in the Demulsification of Produced Water: A Review, Polym. Rev. 0, 1-39—incorporated herein by reference in its entirety. As for O/W emulsions, droplets of oil are dispersed in water while water droplets are dispersed in W/O emulsions. Emulsions that are mostly produced in the process of primary oil production are W/O emulsions, making demulsification or separation of water from the crude oil emulsion necessary before transportation to the refinery. Chemical demulsification is a well-established technique to separate oil from water or to remove water from crude oil. Notable chemical demulsifiers include ionic liquids, polymeric surfactants, and nanoparticles. See Abullah, M. M. S., Al-Lohedan, H. A., Attah, A. M., 2016. Synthesis and application of amphiphilic ionic liquid based on acrylate copolymers as demulsifier and oil spill dispersant, J. Mol. Liq. 219, 54-62; Alves, D., Lourenco, E., Franceschi, E., Santos, A. F., Santana, C. C., Borges, G., Dariva, C., 2017, Influence of Ionic Liquids on the Viscoelastic Properties of Crude Oil Emulsions, Energy & Fuels 31, 9132-9139; Atta, A. M., Al-Lohedan, H. A., Abdullah, M. M. S., 2016, Dipoles poly(ionic liquids) based on 2-acrylamido-2-methylpropane sulfonic acid-co-hydroxyethyl methacrylate for demulsification of crude oil water emulsions, J. Mol. Liq. 222, 680-690; Ezzat, A. O., Atta, A. M., Al-Lohedan, H. A., Abdullah, M. M. S., Hashem, A. I., 2018, Synthesis and Application of Poly(ionic liquid) Based on Cardanol as Demulsifier for Heavy Crude Oil Water Emulsions, Energy and Fuels 32, 214-225; Li, X., Kersten, S. R. A., Schuur, B., 2016, Efficiency and Mechanism of Demulsification of Oil-in-Water Emulsions Using Ionic Liquids, Energy & Fuels 30, 7622-7628; Alsabagh, A. M., Hassan, M. E., Desouky, S. E. M., Nasser, N. M., Elsharaky, E. A., Abdelhamid, M. M., 2016, Demulsification of W/O emulsion at petroleum field and reservoir conditions using some demulsifiers based on polyethylene and propylene oxides, Egypt. J. Pet. 25, 585-595; Cao, Y., Jin, Y., Li, J., Zou, D., Chen, X., 2016, Demulsification of the phosphoric acid-tributyl phosphate (W/O) emulsion by hydrocyclone. Sep. Purif. Technol. 158, 387-395; Feng, X., Wang, S., Hou, J., Wang, L., Cepuch, C., Masliyah, J., Xu, Z., 2011, Effect of hydroxyl content and molecular weight of biodegradable ethylcellulose on demulsification of water-in-diluted bitumen emulsions, Ind. Eng. Chem. Res. 50, 6347-6354; Feng, X., Mussone, P., Gao, S., Wang, S., Wu, S. Y., Masliyah, J. H., Xu, Z., 2010, Mechanistic study on demulsification of water-in-diluted bitumen emulsions by ethylcellulose, Langmuir 26, 3050-3057; Pensini, E., Harbottle, D., Yang, F., Tchoukov, P., Li, Z., Kailey, I., Behles, J., Masliyah, J., Xu, Z., 2014, Demulsification mechanism of asphaltene-stabilized water-in-oil emulsions by a polymeric ethylene oxide-propylene oxide demulsifier, Energy and Fuels 28, 6760-6771; Roostaie, T., Farsi, M., Rahimpour, M. R., Biniaz, P., 2017, Performance of biodegradable cellulose based agents for demulsification of crude oil: Dehydration capacity and rate, Sep. Purif. Technol. 179, 291-296; Takahashi, Y., Fukuyasu, K., Horiuchi, T., Kondo, Y., Stroeve, P., 2014, Photoinduced demulsification of emulsions using a photoresponsive gemini surfactant, Langmuir 30, 41-47; Ali, N., Zhang, B., Zhang, H., Zaman, W., Li, X., Li, W., Zhang, Q., 2015, Interfacially active and magnetically responsive composite nanoparticles with raspberry like structure; synthesis and its applications for heavy crude oil/water separation, Colloids Surfaces A Physicochem. Eng. Asp. 472, 38-49; Liang, J., Du, N., Song, S., Hou, W., 2015, Magnetic demulsification of diluted crude oil-in-water nanoemulsions using oleic acid-coated magnetite nanoparticles, Colloids Surfaces A Physicochem. Eng. Asp. 466, 197-202; Liu, J., Wang, H., Li, X., Jia, W., Zhao, Y., Ren, S., 2017, Recyclable magnetic graphene oxide for rapid and efficient demulsification of crude oil-in-water emulsion, Fuel 189, 79-87; Lu, T., Chen, Y., Qi, D., Cao, Z., Zhang, D., Zhao, H., 2017, Treatment of emulsified oil wastewaters by using chitosan grafted magnetic nanoparticles, J. Alloys Compd. 696, 1205-1212; Nikkhah, M., Tohidian, T., Rahimpour, M. R., Jahanmiri, A., 2015, Efficient demulsification of water-in-oil emulsion by a novel nano-titania modified chemical demulsifier, Chem. Eng. Res. Des. 94, 164-172; Zhang, J., Li, Y., Bao, M., Yang, X., Wang, Z., 2016, Facile Fabrication of Cyclodextrin-Modified Magnetic Particles for Effective Demulsification from Various Types of Emulsions, Environ. Sci. Technol. 50, 8809-8816; and Zhang, S., Lü, T., Qi, D., Cao, Z., Zhang, D., Zhao, H., 2017, Synthesis of quaternized chitosan-coated magnetic nanoparticles for oil-water separation, Mater. Lett. 191, 128-131—each incorporated herein by reference in their entirety.

Apart from the chemical demulsification, other demulsification techniques applied to crude oil emulsions separation include freeze/thaw, microwave, electrostatic demulsification as well as hydrocyclone-based techniques. See Lin, C., He, G., Li, X., Peng, L., Dong, C., Gu, S., Xiao, G., 2007, Freeze/thaw induced demulsification of water-in-oil emulsions with loosely packed droplets, Sep. Purif. Technol. 56, 175-183; Yang, X., Tan, W., Bu, Y., 2009, Demulsification of Asphaltenes and Resins Stabilized Emulsions via the Freeze/Thaw Method Demulsification of Asphaltenes and Resins Stabilized Emulsions via the Freeze/Thaw Method, Energy & Fuels 23, 481-486; Fortuny, M., Oliveira, C. B. Z., Melo, R. L. F. V, Nele, M., Coutinho, R. C. C., Santos, A. F., 2007, Effect of Salinity, Temperature, Water Content, and pH on the Microwave Demulsification of Crude Oil Emulsions, Energy & Fuels 21, 1358-1364; Lemos, R. C. B., Da Silva, E. B., Dos Santos, A., Guimarães, R. C. L., Ferreira, B. M. S., Guarnieri, R. A., Dariva, C., Franceschi, E., Santos, A. F., Fortuny, M., 2010, Demulsification of water-in-crude oil emulsions using ionic liquids and microwave irradiation, Energy and Fuels 24, 4439-4444; Martinez-Palou, R., Cerón-Camacho, R., Chávez, B., Vallejo, A. A., Villanueva-Negrete, D., Castellanos, J., Karamath, J., Reyes, J., Aburto, J., 2013, Demulsification of heavy crude oil-in-water emulsions: A comparative study between microwave and thermal heating, Fuel 113, 407-414; Xu, P., Wang, Z., Xu, Z., Hao, J., Sun, D., 2016, Highly effective emulsification/demulsification with a CO2-switchable superamphiphile, J. Colloid Interface 480, 198-204; and Cao, Y., Jin, Y., Li, J., Zou, D., Chen, X., 2016, Demulsification of the phosphoric acid-tributyl phosphate (W/O) emulsion by hydrocyclone. Sep. Purif. Technol. 158, 387-395—each incorporated herein by reference in their entirety.

It is known that demulsifiers are surface-active substances, where the demulsifying impact is based on the breaking of the adsorbed surfactants. This process usually leads to a weak interfacial film and eventually allows water drops to aggregate and coalesce into large droplets. Currently, formaldehyde resins, oxide-polyethylene oxide, alkyl-phenol copolymers of polypropylene, alkoxylated epoxy resins, alkoxylated amines, and their mixtures are commonly used demulsifiers in the petroleum industry. See Hippmann, S., Ahmed, S. S., Fröhlich, P., Bertau, M., 2018, Demulsification of water/crude oil emulsion using natural rock Alginite, Colloids Surfaces A Physicochem. Eng. Asp. 553, 71-79—incorporated herein by reference in its entirety. However, due to the high cost of oil field demulsifiers and stringent environmental regulations on crude oil production and refining, there is a great interest to use safer and less expensive demulsifiers for the removal of water from crude oil emulsions. Hence, selection and identification of new effective demulsifiers for breaking crude oil emulsions are highly desired in the oilfield industry.

Palm oil fuel ash (POFA) is one of the byproducts of the palm oil industry, derived by burning the waste material such as empty fruit bunches, palm oil fiber, and kernel. See Hamada, H. M., Jokhio, G. A., Yahaya, F. M., Humada, A. M., Gul, Y., 2018, The present state of the use of palm oil fuel ash (POFA) in concrete, Constr. Build. Mater.—incorporated herein by reference in its entirety. Malaysia is one of the largest producers of POFA, generating nearly 10 million tons/year. For many years, owing largely to a nutrient content too low to be used in fertilizer, POFA was deemed a nuisance and disposed of in open fields. Only recently has POFA received great attention for various applications, mostly in the construction industry. It has been utilized to prepare durable and high strength concretes. See Hamada, H. M., Jokhio, G. A., Yahaya, F. M., Humada, A. M., Gul, Y., 2018, The present state of the use of palm oil fuel ash (POFA) in concrete, Constr. Build. Mater.; Salami, B. A., Megat Johari, M. A., Ahmad, Z. A., Maslehuddin, M., Adewumi, A. A., 2018, Impact of $Al(OH)_3$ addition to POFA on the compressive strength of POFA alkali-activated mortar, Constr. Build. Mater. 190, 65-82; Salami, B. A., Megat Johari, M. A., Ahmad, Z. A., Maslehuddin, M., 2017, Durability performance of Palm Oil Fuel Ash-based Engineered Alkaline-activated Cementitious Composite (POFA-EACC) mortar in sulfate environment, Constr. Build. Mater. 131, 229-244; Wi, K., Lee, H.-S., Lim, S., Song, H., Hussin, M. W., Ismail, M. A., 2018, Use of an agricultural by-product, nano sized Palm Oil Fuel Ash as a supplementary cementitious material. Constr. Build. Mater. 183, 139-149; Zeyad, A. M., Megat Johari, M. A., Tayeh, B. A., Yusuf, M. O., 2017, Pozzolanic reactivity of ultrafine palm oil fuel ash waste on strength and durability performances of high strength concrete, J. Clean. Prod. 144, 511-522; and Zeyad, A. M., Megat Johari, M. A., Tayeh, B. A., Yusuf, M. O., 2016, Efficiency of treated and untreated palm oil fuel ash as a supplementary binder on engineering and fluid transport properties of high-strength concrete, Constr. Build. Mater. 125, 1066-1079—each incorporated herein by reference in its entirety.

POFA has also been applied as an adsorbent in wastewater treatment and for upgrading and reforming methane. See Acquah, C., Sie Yon, L., Tuah, Z., Ling Ngee, N., Danquah, M. K., 2016, Synthesis and performance analysis of oil palm ash (OPA) based adsorbent as a palm oil bleaching material, J. Clean. Prod. 139, 1098-1104; Hasan, R., Chong, C. C., Setiabudi, H. D., Jusoh, R., Jalil, A. A., 2018, Process optimization of methylene blue adsorption onto eggshell-treated palm oil fuel ash, Environ. Technol. Innov.; Imla Syafiqah, M. S., Yussof, H. W., 2018, Kinetics, isotherms, and thermodynamic studies on the adsorption of mercury (ii) ion from aqueous solution using modified palm oil fuel ash, Mater. Today Proc. 5, 21690-21697; Khanday, W. A., Hameed, B. H., 2018, Zeolite-hydroxyapatite-activated oil palm ash composite for antibiotic tetracycline adsorption, Fuel 215, 499-505; Kongnoo, A., Tontisirin, S., Worathanakul, P., Phalakornkule, C., 2017, Surface characteristics and $CO_2$ adsorption capacities of acid-activated zeolite 13X prepared from palm oil mill fly ash, Fuel 193, 385-394; Khanday, W. A., Okoye, P. U., Hameed, B. H., 2017, Biodiesel byproduct glycerol upgrading to glycerol carbonate over lithium-oil palm ash zeolite, Energy Convers. Manag. 151, 472-480; and Abdullah, N., Chong, C. C., Razak, H. A., Ainirazali, N., Chin, S. Y., Setiabudi, H. D., 2018, Synthesis of Ni/SBA-15 for CO2 reforming of CH4: Utilization of palm oil fuel ash as silica source, Mater. Today Proc. 5, 21594-21603—each incorporated herein by reference in their entirety.

Other areas of POFA application include polymer concrete, soil stabilization, and coatings. See Hafizah Khalid, N. A., Hussin, M. W., Mirza, J., Farhayu Ariffin, N., Ismail, M. A., Lee, H.-S., Mohamed, A., Putra Jaya, R., 2016, Palm oil fuel ash as potential green micro-filler in polymer concrete, Constr. Build. Mater. 102, 950-960; Hafizah, N., Khalid, A., Hussin, W., Ismail, M., Basar, N., Ismail, M. A., Lee, H.-S., Mohamed, A., 2015, Evaluation of effectiveness of methyl methacrylate as retarder additive in polymer concrete, Constr. Build. Mater. 93, 449-456; Pourakbar, S., Asadi, A., Huat, B. B. K., Fasihnikoutalab, M. H., 2015, Stabilization of clayey soil using ultrafine palm oil fuel ash (POFA) and cement, Transp. Geotech. 3, 24-35; and Saharudin, K. A., Sreekantan, S., Basiron, N., Chun, L. K., Kumaravel, V., Abdullah, T. K., Ahmad, Z. A., 2018, Improved super-hydrophobicity of eco-friendly coating from palm oil fuel ash (POFA) waste, Surf. Coatings Technol. 337, 126-135—each incorporated herein by reference in their entirety.

In view of the forgoing, there is a need for effective and fast-acting demulsifiers that are non-toxic, inexpensive, and which do not partition into the oil phase after breaking the emulsion for easy removal.

SUMMARY OF THE INVENTION

Accordingly, it is one object of the present invention to provide novel methods of demulsifying oil and water emulsions with palm oil fuel ash.

Thus the present disclosure provides:

A method of demulsifying an emulsion comprising oil and water by adding palm oil fuel ash to the emulsion, and agitating thereby breaking the emulsion into an aqueous phase and an oil phase.

In some embodiments, the palm oil fuel ash is added in an amount of 0.1 to 20 wt. %, based on a total weight of the emulsion.

In some embodiments, the palm oil fuel ash is added in an amount of 1 to 4 wt. %, based on a total weight of the emulsion.

In some embodiments, the palm oil fuel ash is obtained by drying raw palm oil fuel ash at 80 to 120° C., mechanically ball milling at 140 to 220 rpm, and calcining at 500 to 600° C.

In some embodiments, the palm oil fuel ash has a bimodal particle size distribution with a first mode particle size of 2 to 4 μm and second mode particle size of 20 to 30 μm.

In some embodiments, the palm oil fuel ash comprises, as constituent oxides, 60 to 72 wt. % $SiO_2$, 4 to 8 wt. % $Al_2O_3$, 3 to 7 wt. % $Fe_2O_3$, 3 to 8 wt. % CaO, 1 to 5 wt. % MgO, 3 to 7 wt. % $K_2O$, 0.2 to 0.5 wt. % $SO_3$, and 0.1 to 0.25 wt. % $Na_2O$, each based on a total weight of the palm oil fuel ash.

In some embodiments, the palm oil fuel ash comprises, as constituent oxides, 66 to 68 wt. % $SiO_2$, 6 to 7 wt. % $Al_2O_3$, 5 to 6.5 wt. % $Fe_2O_3$, 5 to 6 wt. % CaO, 2.5 to 3.5 wt. % MgO, 4.5 to 6 wt. % $K_2O$, 0.3 to 0.35 wt. % $SO_3$, and 0.18 to 0.2 wt. % $Na_2O$, each based on a total weight of the palm oil fuel ash.

In some embodiments, the palm oil fuel ash is the only demulsifier employed.

In some embodiments, the emulsion is a water-in-oil (w/o) emulsion.

In some embodiments, the emulsion has a volume ratio of oil to water of 2:8 to 4:6.

In some embodiments, the oil is crude oil.

In some embodiments, the crude oil comprises 40 to 60 wt. % aromatics, 25 to 50 wt. % saturates, 5 to 18 wt. % resins, and 1 to 5 wt. % asphaltenes, each based on a total weight of the crude oil.

In some embodiments, the crude oil has an API gravity of 28 to 35, a density of 0.8 to 0.94 $g/cm^3$, and a viscosity of 9 to 13 mPa·s, each measured at 15° C.

In some embodiments, the water is salt water having a total dissolved solids content of 10,000 to 100,000 mg/L.

In some embodiments, the oil is crude oil and the emulsion is obtained from a well in a subterranean geological formation.

In some embodiments, the palm oil fuel ash is added to the emulsion downstream of the well and upstream of a storage tank or a separation unit.

In some embodiments, the emulsion has a temperature of 20 to 90° C.

In some embodiments, the method achieves a demulsification efficiency (DE), defined as a volume (V) of the aqueous phase separated from the oil phase divided by an initial volume of water present in the emulsion ($V_o$) multiplied by 100, of 85 to 99.9%.

In some embodiments, the method further involves separating the aqueous phase from the oil phase to provide an oil phase which is substantially free of water.

In some embodiments, after breaking the emulsion, the palm oil fuel ash settles to the bottom of the aqueous phase as settled solid particles, and the method further involves separating the settled solid particles of palm oil fuel ash from the aqueous phase.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

FIG. 8A illustrates the viscosity versus time profile; FIG. 8B illustrates the elastic modulus versus time profile;

DETAILED DESCRIPTION OF THE INVENTION

Figure 1:
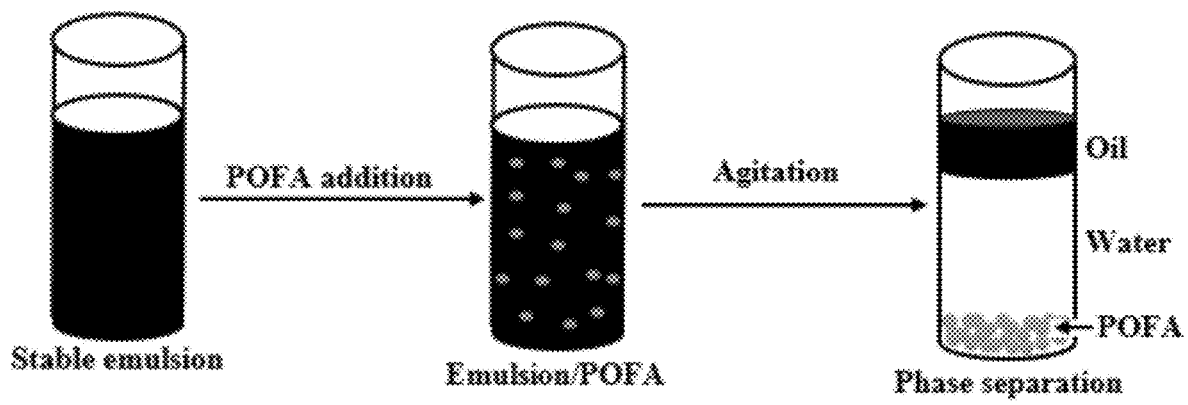
FIG. 1 is a schematic of the demulsification test with POFA.

In the following description, it is understood that other embodiments may be utilized and structural and operational changes may be made without departure from the scope of the present embodiments disclosed herein.

Definitions

As used herein, "connate" is native water present in a subterranean formation along with hydrocarbon.

As used herein, "wastewater" means a water source obtained from storm drains, sedimentation ponds, runoff/outflow, landfills, as well as water sources resulting/obtained from industrial processes such as factories, mills, farms, mines, quarries, industrial drilling operations, oil and gas recovery operations, papermaking processes, food preparation processes, phase separation processes, washing processes, waste treatment plants, toilet processes, power stations, incinerators, spraying and painting, or any other manufacturing or commercial enterprise, which comprises water and one or more compounds or materials derived from such industrial processes, including partially treated water from these sources.

As used herein, the term "fatty" describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein. For example, stearic acid, which has 18 carbons total (a fatty portion with 17 carbon atoms and 1 carbon atom from the —COOH group), is considered to be a fatty acid having 18 carbon atoms herein.

As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide, EO), (poly)oxypropylene (derived from propylene oxide, PO), and (poly)oxybutylene (derived from butylene oxide, BO), as well as mixtures thereof.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 26 carbon atoms, preferably 2 to 24, preferably 3 to 22, preferably 4 to 20, preferably 5 to 18, preferably 6 to 16, preferably 7 to 14, preferably 8 to 12, preferably 9 to 10. Non-limiting examples include, but are not limited to, methyl, ethyl, propyl, isopropyl, butyl, isobutyl, t-butyl, pentyl, isopentyl, neopentyl, hexyl, iso-hexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), and unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like. Cycloalkyl is a type of cyclized alkyl group. Exemplary cycloalkyl groups include, but are not limited to, cyclopropyl, cyclobutyl, cyclopentyl, cyclohexyl, norbornyl, and adamantyl. The term "lower alkyl" is used herein to describe alkyl groups having 1 to 5 carbon atoms (e.g., methyl, ethyl, n-propyl, etc.).

As used herein, unless otherwise specified, the term "aryl" refers to an aromatic group containing only carbon in the aromatic ring(s), such as phenyl, biphenyl, naphthyl, anthracenyl, and the like. The term "heteroarene" refers to an arene compound or aryl group where at least one carbon atom is replaced with a heteroatom (e.g., nitrogen, oxygen, sulfur) and includes, but is not limited to, pyridine, pyrimidine, quinoline, isoquinoline, pyrazine, pyridazine, indole, pyrrole, oxazole, furan, benzofuran, thiophene, benzothiophene, isoxazole, pyrazole, triazole, tetrazole, indazole, purine, carbazole, imidazole, and benzimidazole.

As used herein, "alkanoyloxy" groups are alkanoyl groups that are bound to oxygen (—O—C(O)-alkyl), for example, acetyloxy, propionyloxy, butyryloxy, isobutyryloxy, pivaloyloxy, valeryloxy, hexanoyloxy, octanoyloxy, lauroyloxy, and stearoyloxy. "Alkoxycarbonyl" substituents are alkoxy groups bound to C=O (e.g. —C(O)—Oalkyl), for example methyl ester, ethyl ester, and pivaloyl ester substitution where the carbonyl functionality is bound to the rest of the compound.

As used herein, "optionally substituted" means that at least one hydrogen atom is replaced with a non-hydrogen group, provided that normal valencies are maintained and that the substitution results in a stable compound. Such optional substituents may be selected from aryl, alkoxy, aryloxy, arylalkyloxy, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —CONH$_2$, CONHalkyl, —CONHaryl, —CONHarylalkyl or cases where there are two substituents on one nitrogen), and the like.

Methods

A large percentage of crude oil production is obtained in the form of water-in-oil emulsions, i.e., oil containing water in the form of little droplets dispersed throughout the body of oil. These emulsions are often relatively stable and do not become resolved within a reasonable time by mere standing (e.g., the emulsion can be stable for more than 8 weeks). In most cases, the presence of water droplets in crude oil is highly undesirable as it can lead to several problems such as plant instability, production of off-spec crude, high-pressure drops in flow lines, transportation pipeline corrosion, catalyst poisoning in downstream refining/upgrading processes, and increased transportation costs. Thus, it is advantageous to resolve crude oil emulsions before transportation and refinement.

However, known demulsifiers or mixtures of known demulsifiers are not always satisfactory because separation of the water and oil phases takes too long, the demulsifier is costly or treatment involves an excessive dosage of the demulsifier, and/or the demulsifiers are toxic, a problem exacerbated by increasingly stringent environmental regulations. Further, in view of the widely differing composition of crude oils, there is a constant need for improved demulsifiers or demulsifiers adapted to special crude oil qualities.

The present disclosure thus provides a method of demulsifying oil and water emulsions, preferably oil and water emulsions obtained from an oil and gas field, for example salt water and crude oil emulsions. The methods involve adding a palm oil fuel ash (POFA) (demulsifier) into the emulsion, followed by agitating the resulting mixture to break the emulsion into a separate aqueous phase and oil phase.

The methods may optionally involve adding one or more of a secondary demulsifier and an organic solvent to the emulsion, and may also involve separating the aqueous phase from the oil phase to provide an oil phase which is substantially free of water.

Palm oil fuel ash (POFA) The oil palm is a tall-stemmed tree which belongs to the family Arecaceae (commonly known as palms). Oil palm trees, primarily the African oil palm *Elaeis guineensis*, and to a lesser extent the American oil palm *Elaeis oleifera* and the maripa palm *Attalea maripa*, are cultivated for their palm oil producing fruit. The countries in the equatorial belt that cultivate oil palm are Benin Republic, Colombia, Ecuador, Nigeria, Zaire, Malaysia, and Indonesia, of which Malaysia is the largest producer of palm oil and palm oil products (around 47-51% of the worlds exports of palm oil). In the palm oil industry, palm oil is extracted from the fruit and copra of the palm oil tree. After the extraction process, waste products such as palm oil fibers, shells, and empty fruit brunches are burned as biomass boiler fuel at 800 to 1,000° C. to boil water, which generates steam to power a turbine for supplying electrical energy to the entire palm oil mill extraction process. Usually, the palm oil waste product burned in the boiler is made up of about 85% palm oil fibers and about 15% shells and empty fruit bunches. The resulting ashy, combustion byproduct is palm oil fuel ash (POFA), which constitutes about 5 wt. % of solid waste products formed during palm oil processing. POFA does not have sufficient nutrient value to be used as fertilizer and has traditionally been disposed in open fields (profitless).

The inventors have found a new use for palm oil fuel ash as a demulsifier for emulsions of oil and water, such as those common to crude oils produced in oil and gas extractive operations.

The palm oil fuel ash (POFA) may be added to the emulsion in any amount sufficient to provide a desirable demulsification effect (i.e., to break the emulsion into separate water and oil phases with a sufficient quantity of the aqueous phase being removed from the oil phase). While the dosage of POFA may vary depending on the particular POFA employed (e.g., source, combustion conditions, processing conditions, constituent oxide percentages, etc.) and the particular emulsion being treated (e.g., the oil to water ratio, the salinity of the water, the type of oil present, the presence or absence of other surfactants, etc.), the palm oil fuel ash is typically added in an amount of 0.1 to 20 wt. %, preferably 0.2 to 18 wt. %, preferably 0.3 to 16 wt. %, preferably 0.4 to 14 wt. %, preferably 0.5 to 12 wt. %, preferably 0.7 to 10 wt. %, preferably 0.8 to 9 wt. %, preferably 1 to 7 wt. %, preferably 1.2 to 5 wt. %, preferably 1.5 to 4 wt. %, preferably 2 to 3 wt. %, based on a total weight of the emulsion.

In some embodiments, the methods involve the use of 'raw' palm oil fuel ash, that is, palm oil fuel ash as it is formed/received from the oil palm boiler. Raw POFA typically has a high moisture content of from 3 to 19 wt. %, or 4 to 15 wt. %, or 5 to 10 wt. % water, based on a total weight of the POFA, and a relatively large particle size, for example a median particle size of 55 to 75 µm, preferably 60 to 70 µm, preferably 64 to 66 µm, preferably about 65.6 µm.

Alternatively, the palm oil fuel ash employed in the method herein is preferably 'processed' by one or more post-combustion processing techniques such as drying, ball milling, and calcining, prior to use. In preferred embodiments, the POFA utilized in the disclosed methods is processed by a combination of drying, ball milling, and calcining. Briefly, processed POFA may be formed according to the following procedure.

The raw palm oil fuel ash obtained from a palm oil production facility (e.g., palm oil mill, United Oil Palm Industries Sdn. Bhd. in Nibong Tebal, Penang, Malaysia) may first be dried, for example, in an oven at 80 to 120° C., preferably 90 to 110° C., preferably 95 to 105° C., preferably about 100° C., to reduce the moisture content to below 5 wt. %, preferably below 4 wt. %, preferably below 3 wt. %, preferably below 2 wt. %, preferably below 1 wt. %.

The resulting dried palm oil fuel ash may then be subjected to mechanical ball milling to reduce the particle size and/or to increase the surface area of the ash. Any type of ball milling apparatus known to ordinary skill in the art may be employed, including, but not limited to, a standard ball mill, a planetary mill, a vibration mill, an attritor—stirring ball mill, a pin mill, or a rolling mill. The vials and balls used for the ball milling may be individually selected from agate (cryptocrystalline silica), corundum ($Al_2O_3$), zirconium oxide ($ZrO_2$), stainless steel (Fe, Cr, Ni), tempered steel (Fe, Cr), and tungsten carbide (WC), preferably stainless steel (e.g., SS 316). In some embodiments, the balls employed in the ball milling operation have a size of from 6 to 32 mm, preferably 8 to 28 mm, preferably 10 to 24 mm, preferably 12 to 20 mm, preferably a variety of ball sizes are employed for the ball milling operation.

The following ball milling parameters may be utilized. The ball to powder ratio (BPR) or charge ratio represents the weight ratio of the milling balls to the POFA charge. Various BPRs may be employed, but typically a BPR may range from 1:1 to 10:1, preferably 2:1 to 9:1, preferably 3:1 to 8:1, preferably 4:1 to 7:1, preferably 5:1 to 6:1. The dried palm oil fuel ash may be ball milled at a rotational speed of 100 to 600 rpm, preferably 120 to 500 rpm, preferably 140 to 400 rpm, preferably 160 to 300 rpm, preferably 180 to 200 rpm. The milling time may also influence the product morphology and particle size. Suitable milling times that may be practiced herein range from 15 minutes to 8 hours, preferably 30 minutes to 6 hours, preferably 1 to 5 hours, preferably 1.5 to 4.5 hours, preferably about 2 to 4 hours, although shorter or longer milling times may also be practiced. Further, the dried palm oil fuel ash may be ball milled in various atmospheres, for example, in some embodiments, ball milling is performed in air (or a generally oxygen-containing atmosphere, e.g., which includes any atmosphere that contains at least 20%, preferably at least 40%, preferably at least 60%, preferably at least 80%, preferably at least 90%, preferably at least 95%, preferably at least 99%, or about 100% oxygen by volume). Alternatively, ball milling may be carried out under an inert atmosphere such as under nitrogen or argon, preferably argon.

The ball milled palm oil fuel ash may then be calcined. The calcination may be performed in a furnace, for example, a gas-powered furnace. The calcination may be performed using a pre-set temperature program or using other variable temperature systems known by those of ordinary skill in the art. The ball milled palm oil fuel ash may be calcined under isothermal conditions or under variable temperature conditions, typically at a temperature range of 400 to 900° C., preferably 425 to 850° C., preferably 450 to 800° C., more preferably 475 to 750° C., preferably 500 to 700° C., preferably 550 to 600° C. The calcination is typically performed for 20 minutes to 8 hours, preferably 40 minutes to 6 hours, preferably 60 minutes to 4 hours, preferably 80 minutes to 3 hours, preferably 90 minutes to 2 hours, although shorter or longer calcination times may also be used herein.

The resulting palm oil fuel ash ('processed' POFA) may have an average particle size of 1 to 30 µm, preferably 3 to 25 µm, preferably 5 to 20 µm, preferably 7 to 15 µm. In some embodiments, the palm oil fuel ash has a bimodal particle size distribution. In preferred embodiments, the palm oil fuel ash has a bimodal particle size distribution with a first mode particle size of 2 to 4 µm, preferably 2.2 to 3.8 µm, preferably 2.4 to 3.6 µm, preferably 2.6 to 3.4 µm, preferably 2.8 to 3.2 µm, preferably about 3 µm, and second mode particle size of 20 to 30 µm, preferably 21 to 29 µm, preferably 22 to 28 µm, preferably 23 to 27 µm, preferably 24 to 26 µm, preferably about 25 µm. In some embodiments, the first mode particle size is the predominant particle size. For example, a ratio of the relative percent frequency of the first mode particle size to the relative percent frequency of the second mode particle size may range from 1.5:1 to 5:1, preferably 2:1 to 4.5:1, preferably 2.5:1 to 4:1, preferably 3:1 to 3.8:1, preferably 3.4:1 to 3.6:1.

Palm oil fuel ash may vary in terms of the percent of constituent oxides present depending on a number of factors, such as the type of oil palm tree cultivated, the source/location of the oil palm tree cultivated, the relative proportion of the waste products (palm oil fibers, shells, and empty fruit brunches) combusted to produce the POFA, the combustion conditions, as well as the post-combustion processing etc.

The palm oil fuel ash used herein generally comprises, consists of, or consists essentially of, $SiO_2$, $Al_2O_3$, $Fe_2O_3$, CaO, MgO, $K_2O$, $SO_3$, and $Na_2O$. The present disclosure contemplates using a wide variety of palm oil fuel ash materials, with the following constitutional makeup being preferred.

In some embodiments, the palm oil fuel ash added to the emulsion comprises a weight percentage of $SiO_2$ of 60 to 72 wt. %, preferably 61 to 71 wt. %, preferably 62 to 70 wt. %, preferably 63 to 69 wt. %, preferably 64 to 68 wt. %, preferably 65 to 67.5 wt. %, preferably 66 to 67 wt. %, based on a total weight of the palm oil fuel ash.

In some embodiments, the palm oil fuel ash added to the emulsion comprises a weight percentage of $Al_2O_3$ of 4 to 8 wt. %, preferably 4.5 to 7.5 wt. %, preferably 5 to 7 wt. %, preferably 5.5 to 6.8 wt. %, preferably 6 to 6.5 wt. %, based on a total weight of the palm oil fuel ash.

In some embodiments, the palm oil fuel ash added to the emulsion comprises a weight percentage of $Fe_2O_3$ of 3 to 7 wt. %, preferably 3.5 to 6.5 wt. %, preferably 4 to 6.3 wt. %, preferably 4.5 to 6.1 wt. %, preferably 5 to 6 wt. %, preferably 5.5 to 5.8 wt. %, based on a total weight of the palm oil fuel ash.

In some embodiments, the palm oil fuel ash added to the emulsion comprises a weight percentage of CaO of 3 to 8 wt. %, 3.5 to 7 wt. %, preferably 4 to 6.5 wt. %, preferably 4.5 to 6.3 wt. %, preferably 5 to 6.1 wt. %, preferably 5.3 to 6 wt. %, preferably 5.5 to 5.8 wt. %, based on a total weight of the palm oil fuel ash.

In some embodiments, the palm oil fuel ash added to the emulsion comprises a weight percentage of MgO of 1 to 5 wt. %, preferably 1.5 to 4.5 wt. %, preferably 2 to 4 wt. %, preferably 2.5 to 3.8 wt. %, preferably 3 to 3.5 wt. %, preferably 3.1 to 3.2 wt. %, based on a total weight of the palm oil fuel ash In some embodiments, the palm oil fuel ash added to the emulsion comprises a weight percentage of $K_2O$ of 3 to 7 wt. %, preferably 3.5 to 6.5 wt. %, preferably 4 to 6 wt. %, preferably 4.5 to 5.8 wt. %, preferably 5 to 5.4 wt. %, preferably 5.1 to 5.3 wt. %, based on a total weight of the palm oil fuel ash.

In some embodiments, the palm oil fuel ash added to the emulsion comprises a weight percentage of $SO_3$ of 0.2 to 0.5 wt. %, preferably 0.25 to 0.45 wt. %, preferably 0.3 to 0.4 wt. %, preferably 0.31 to 0.38 wt. %, preferably 0.32 to 0.34 wt. %, based on a total weight of the palm oil fuel ash.

In some embodiments, the palm oil fuel ash added to the emulsion comprises a weight percentage of $Na_2O$ of 0.1 to 0.25 wt. %, preferably 0.13 to 0.23 wt. %, preferably 0.15 to 0.22 wt. %, preferably 0.17 to 0.21 wt. %, preferably 0.18 to 0.2 wt. %, based on a total weight of the palm oil fuel ash.

In some embodiments, the palm oil fuel ash used in the methods of the present disclosure has a loss on ignition (LOI) of less than 4 wt. %, preferably less than 3 wt. %, preferably less than 2.5 wt. %, preferably less than 2.4 wt. %, preferably less than 2.3 wt. %.

In preferred embodiments, the palm oil fuel ash comprises, as constituent oxides, 66 to 68 wt. % $SiO_2$, 6 to 7 wt. % $Al_2O_3$, 5 to 6.5 wt. % $Fe_2O_3$, 5 to 6 wt. % CaO, 2.5 to 3.5 wt. % MgO, 4.5 to 6 wt. % $K_2O$, 0.3 to 0.35 wt. % $SO_3$, and 0.18 to 0.2 wt. % $Na_2O$, each based on a total weight of the palm oil fuel ash.

The inventors have discovered that a particular advantage of using palm oil fuel ash as a demulsifier, in addition to its effectiveness, is that POFA itself does not become suspended in the oil (or water) phase after emulsion breaking and phase separation. Instead, after breaking the emulsion, POFA particles tend to settle at the bottom of the aqueous phase, making separation of the top oil phase extremely facile, that is, the oil phase does not require additional cleaning and/or separation steps in order to remove demulsifier. Further, because the POFA particles aggregate and settle to the bottom of the aqueous phase, the aqueous phase may also be easily separated from the POFA demulsifier using well known solid-liquid separation techniques. This stands in stark contrast to many demulsifiers such as nanosilica and alkylene oxide polymers (poloxamers), which themselves become suspended in the oil phase after the emulsion is broken. Thus in order to obtain contaminant free oil using such demulsifiers, for example crude oil free of demulsifiers, additional removal/separation steps must be taken to remove the demulsifier, for example, prior to upgrading/refining the crude oil. Such additional removal/separation steps can be difficult and of course generally lead to increased production costs.

Without being bound by theory, it is believed that the POFA particles are homogenously dispersed throughout the continuous phase (e.g., the oil phase) after agitation, where they replace any emulsifiers present at the interface between the oil and water, for example, asphaltenes and resins found in crude oil, leading to instability of the water/oil interfacial film. In the case of water-in-oil emulsions, the interface is between water droplets dispersed within a continuous oil phase, and in the case of oil-in-water emulsions the interface is between oil droplets dispersed within a continuous water phase. This in turn may cause the separation and gradual coalescence of water and oil droplets, and then after a certain size, the water droplets fall towards the bottom while the oil droplets rise towards the top, eventually forming two distinct layers/phases. The POFA particles eventually settle on the bottom of the water phase, which as discussed above, is particularly advantageous as the POFA particles are thus far removed from the oil phase, simplifying oil (e.g., crude oil) isolation.

In preferred embodiments, the palm oil fuel ash is the only demulsifier employed in the disclosed methods, that is, no secondary demulsifiers are added to the emulsion (e.g., the emulsion is substantially free of secondary demulsifiers).

Secondary Demulsifiers

While the palm oil fuel ash demulsifiers of the present disclosure are particularly desirable in the demulsification of oil/water emulsions such as crude petroleum oil emulsions, it is contemplated that for this application as well as the demulsification of other hydrocarbon based emulsions that the POFA demulsifiers can be optionally used in admixture with suitable secondary demulsifying agents. Such secondary demulsifiers include, but are not limited to, polymer-based demulsifiers or wetting agents such as i) formaldehyde resins (e.g., melamine formaldehyde, urea-formaldehyde, phenol formaldehyde, etc.); ii) epoxy resins; iii) alkyl-phenol copolymers of polypropylene; iv) polyamides (e.g., polyacrylamides) v) polyethyleneimines (PEI) which may be oligomers or polymers with a repeating unit composed of an amine group and a two carbon aliphatic (—$CH_2CH_2$—) spacer, and may be linear polyethylene imines containing all secondary amines (with the exception of the terminal positions), or branched polyethylene imines containing primary, secondary and tertiary amino groups; vi) alkoxylated variants of any of the polymer-based demulsifiers of i) to v); alkylene oxide polymers such as polyethylene glycol, polypropylene glycol, ethylene oxide (EO)/propylene oxide (PO) block copolymers including diblock and triblock (e.g., poloxamers) copolymers of alkylene oxides (e.g., EO-PO-EO or PO-EO-PO) with specific mention being made to POLOXAMER 407 available from Sigma-Aldrich, which is a triblock copolymer of a central hydrophobic block of polypropylene glycol flanked by two hydrophilic blocks of polyethylene glycol, also known as PLURONIC F127 (BASF) or SYNPERONIC PE/F 127 (Croda);

alkoxylated compounds such as (i) alkoxylated amines; (ii) alkoxylated oils such as alkoxylated palm oil (e.g., discard palm oil-alkylene oxide condensation product described in U.S. Pat. No. 2,745,855—incorporated herein by reference in its entirety); (iii) reaction products of alkoxylated polyols or polyol esters with dicarboxylic acids such as reaction products of alkoxylated glycerol, threitol, erythritol, inositol, arabitol, xylitol, sorbitol, sorbitan, or esters thereof, for example, ethoxylated sorbitan monolaurate, monopalmitate, monostearate or monooleate reacted with a dicarboxylic acid such as phthalic acid, terephthalic acid, isophthalic acid, malonic acid, succinic acid, glutaric acid, adipic acid, pimelic acid, suberic acid, axelaic acid and sebacic acid (for example those reaction products disclosed in U.S. Pat. No. 9,695,366—incorporated herein by reference in its entirety); (iv) alkoxylated fatty acid esters, for example, polyalkylene glycol esters of fatty acids and those derived from the addition of an alkylene oxide (e.g., EO and/or PO) onto a ring opened reaction product of an epoxidized fatty acid triglyceride with a fatty acid (for example those disclosed in U.S. Pat. No. 6,310,106—incorporated herein by reference in its entirety);

sulfonates such as alkali metal petroleum sulfonates (e.g., sodium petroleum mahogany sulfonate), alkylated aryl sulfonates (e.g., ammonium salt of a propylated condensed aromatic monosulfonic acid);

particles including both microparticles or nanoparticles, such as particles of silica, colloidal silica, magnetic particles coated with silica, aluminum oxide, borosilicate)

oxidized oils such as oxidized vegetable oil (e.g., blown castor oil);

fatty amides and fatty acid esters;

ionic liquids, and mixtures thereof

When employed, the secondary demulsifiers may be added in an amount up to 20 wt. %, preferably up to 15 wt. %, preferably up to 10 wt. %, preferably up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, based on a total weight of the emulsion.

Organic Solvent

To improve their dosability, the POFA and any optional secondary demulsifiers may optionally be dosed in dissolved/suspended form through the use of a suitable organic solvent(s). When employed, the organic solvent may be used in an amount of up to 10 wt. %, preferably up to 8 wt. %, preferably up to 6 wt. %, preferably up to 4 wt. %, preferably up to 2 wt. %, preferably up to 1 wt. %, preferably up to 0.5 wt. %, based on a total weight of the emulsion.

The organic solvent may be at least one selected from the group consisting of a polar aprotic solvent, an aromatic solvent, a terpineol, a solvent produced from natural gas condensates or a petroleum distillate, a mono alcohol with 1 to 12 carbon atoms, and a polyol with 2 to 18 carbon atoms. Acceptable organic solvents include, but are not limited to, formamide, dimethyl formamide, dimethyl acetamide, acetone, methyl ethyl ketone, methanol, ethanol, propanol, isopropanol, n-butanol, isobutanol, n-pentanol, n-hexanol, terpineol, menthol, prenol, 3-methyl-3-buten-1-ol, 2-ethyl-1-hexanol, 2-ethyl-1-butanol, 2-propylheptan-1-ol, 2-butyl-1-octanol, ethylene glycol, diethylene glycol, triethylene glycol, tetraethylene glycol, ethylene glycol methyl ether, ethylene glycol ethyl ether, ethylene glycol propyl ether, ethylene glycol butyl ether, diethylene glycol monomethyl ether, diethylene glycol monoethyl ether, propylene glycol, dipropylene glycol, propylene glycol monomethyl ether, pyrocatechol (1,2-benzenediol), resorcinol (1,3-benzenediol), benzene, toluene, heavy aromatic naptha, phenol, cresol, benzyl alcohol, 1,3-propanediol, 1,3-butanediol, 2-butoxyethanol, 1,4-butanediol, 1,6-hexanediol, glycerol, pentaerythritol, manitol, sorbitol, as well as mixtures thereof. In preferred embodiments, the organic solvent is at least one selected from the group consisting of acetone, methyl ethyl ketone, methanol, ethanol, propanol, isopropanol, n-butanol, isobutanol, ethylene glycol, and diethylene glycol, more preferably acetone and ethanol.

In preferred embodiments, the methods disclosed herein do not involve the use of an organic solvent, that is, the emulsions are substantially free of organic solvents.

Emulsions

The emulsions that may be treated in the present disclosure are not particularly limited, and any emulsion containing oil and water may be treated according to the methods herein. The emulsion may be an oil-in-water (o/w) emulsion or a water-in-oil (w/o) emulsion. In preferred embodiments, the emulsion is a water-in-oil (w/o) emulsion. In preferred embodiments, the emulsion is a crude oil emulsion obtained from a well in a subterranean geological formation, and therefore, the method may first involve recovering a crude oil emulsion from a subterranean reservoir. The emulsion (e.g., w/o emulsion) may have a wide range of oil to water volume ratios, for example, of from 1:20 to 20:1, preferably 1:18 to 18:1, preferably 1:16 to 16:1, preferably 1:14 to 14:1, preferably 1:12 to 12:1, preferably 1:10 to 10:1, preferably 1:8 to 8:1, preferably 1:6 to 6:1, preferably 1:4 to 4:1, preferably 1:3 to 3:1. In preferred embodiments, the emulsion has a volume ratio of oil to water of 2:8 to 4:6, preferably 3:7.

The emulsion may contain 5 to 95 wt. %, or 10 to 90 wt. %, or 15 to 85 wt. %, or 20 to 80 wt. %, or 25 to 75 wt. %, or 30 to 70 wt. %, or 35 to 65 wt. %, or 40 to 60 wt. %, or 45 to 55 wt. %, or 50 wt. % of water/an aqueous phase, based on a total weight of the emulsion. The aqueous phase may be fresh water (e.g., purified water, wastewater having low salinity, or water obtained from streams, rivers, lakes, ground water, aquifers, etc.) or salt water (e.g., seawater, coastal aquifers, connate, or wastewater having high salinity). When the emulsion is obtained from a subterranean reservoir, the aqueous phase may be formed from the connate or produced water in that particular reservoir, or any connate or produced water in that particular reservoir that is subsequently diluted. The aqueous phase may thus also contain any materials that were previously injected into the subterranean formation, for example to increase production or to otherwise treat the well. Therefore, the contents of the aqueous phase (i.e., types and quantities of salts dissolved, types and quantities of dissolved chemicals, etc. entrained therein) may depend on the type and location of the subterranean reservoir, and any type of treatment previously performed on the well from which the emulsion is recovered.

Palm oil fuel ash has been found to be particularly advantageous as a demulsifier in that it is effective in emulsions having an aqueous phase with a high TDS content, and thus can be used without the need for extra desalting operations, for example using desalter process units. The POFA demulsifiers are suitable for use in emulsions containing salt water having a total dissolved solids content of up to 300,000 mg/L, for example 10,000 to 100,000 mg/L, preferably 20,000 to 90,000 mg/L, preferably 30,000 to 80,000 mg/L, preferably 40,000 to 70,000 mg/L, preferably 50,000 to 60,000 mg/L, preferably 55,000 to 58,000 mg/L.

Representative examples of cations which may be optionally present in the water/aqueous phase include, but are not limited to, sodium, potassium, magnesium, calcium, strontium, barium, iron (ferrous and ferric), lead, copper, cobalt, manganese, nickel, zinc, aluminum, chromium, and titanium, as well as mixtures thereof. Representative examples of anions which may be optionally present in the water/aqueous phase include, but are not limited to, chloride, carbonate, bicarbonate, sulfate, bromide, iodide, acetate, hydroxide, sulfide, hydrosulfide, chlorate, fluoride, hypochlorite, nitrate, nitrite, perchlorate, peroxide, phosphate, phosphite, sulfite, hydrogen phosphate, hydrogen sulfate, as well as mixtures thereof.

In some embodiments, the emulsion contains salt water having at least sodium ions in an amount of 17,000 to 19,000 mg/L, preferably 17,500 to 18,800 mg/L, preferably 18,000 to 18,600 mg/L, preferably 18,200 to 18,400 mg/L; calcium ions in an amount of 500 to 900 mg/L, preferably 550 to 850 mg/L, preferably 600 to 800 mg/L, preferably 650 to 750 mg/L; magnesium ions in an amount of 1,900 to 2,300 mg/L, preferably 1,950 to 2,250 mg/L, preferably 2,000 to 2,200 mg/L, preferably 2,050 to 2,150 mg/L; sulfate ions in an amount of 4,000 to 4,600 mg/L, preferably 4,100 to 4,500 mg/L, preferably 4,200 to 4,400 mg/L, preferably 4,250 to 4,350 mg/L; chloride ions in an amount of 30,000 to 34,000 mg/L, preferably 31,000 to 33,000 mg/L, preferably 32,000 to 32,500 mg/L, preferably 32,100 to 32,300 mg/L; and bicarbonate ions in an amount of 50 to 150 mg/L, preferably 75 to 140 mg/L, preferably 80 to 130 mg/L, preferably 90 to 110 mg/L.

The emulsion may contain 5 to 95 wt. %, or 10 to 90 wt. %, or 15 to 85 wt. %, or 20 to 80 wt. %, or 25 to 75 wt. %, or 30 to 70 wt. %, or 35 to 65 wt. %, or 40 to 60 wt. %, or 45 to 55 wt. %, or 50 wt. % of an oil/oil phase, based on a total weight of the emulsion.

In preferred embodiments, the emulsion is obtained from a subterranean reservoir and the oil is crude oil. The crude oil may be a very light crude oil such as Arab Extra Light, Arab Super Light, or Arab Super Light Ardjuna crude oil (e.g., a jet fuel, gasoline, kerosene, petroleum ether, petroleum spirit, or petroleum naphtha crude oil), a light crude oil such as Arab Light or Arab Light/Seg 17 Blend crude oil (e.g., grade 1 and grade 2 fuel oil, diesel fuel oil, domestic fuel oil), a medium crude oil such as Arab Medium crude oil, and a heavy crude oil such as Arab Heavy crude oil (e.g., grade 3, 4, 5, and 6 fuel oil, heavy marine fuel). Both sweet (sulfur volume lower than 0.50%) and sour (sulfur volume higher than 0.50%) crude oils may be demulsified according to the methods herein. In preferred embodiments, the crude oil is a light or medium crude oil, preferably a light crude oil.

In some embodiments, the crude oil comprises 40 to 60 wt. %, preferably 42 to 58 wt. %, preferably 44 to 56 wt. %, preferably 46 to 54 wt. %, preferably 48 to 52 wt. %, preferably about 50 wt. % aromatics, based on a total weight of the crude oil. In some embodiments, the crude oil comprises 25 to 50 wt. %, preferably 27 to 48 wt. %, preferably 29 to 46 wt. %, preferably 31 to 44 wt. %, preferably 33 to 42 wt. %, preferably 36 to 40 wt. % saturates, based on a total weight of the crude oil. In some embodiments, the crude oil comprises 5 to 18 wt. %, preferably 7 to 16 wt. %, preferably 9 to 14 wt. %, preferably 11 to 13 wt. % resins, based on a total weight of the crude oil. In some embodiments, the crude oil comprises 1 to 5 wt. %, preferably 1.5 to 4.5 wt. %, preferably 2 to 4 wt. %, preferably 2.2 to 3.5 wt. %, preferably 2.4 to 3 wt. %, preferably 2.6 to 2.9 wt. %, preferably 2.7 to 2.8 wt. % asphaltenes, based on a total weight of the crude oil.

The methods may be performed on a variety of emulsion types containing various crude oils having wide ranging properties. For example, in some embodiments, the crude oil has an American Petroleum Institute (API) gravity at 15° C. of 28 to 35, preferably 30 to 34.5, preferably 31 to 34, preferably 32 to 33.5, preferably 32.2 to 33, preferably 32.4 to 32.5. In some embodiments, the crude oil has a density at 15° C. of 0.8 to 0.94 g/cm$^3$, preferably 0.82 to 0.92 g/cm$^3$, preferably 0.84 to 0.90 g/cm$^3$, preferably 0.86 to 0.88 g/cm$^3$. In some embodiments, the crude oil has a viscosity at 15° C. of 9 to 13 mPa·s, preferably 9.5 to 13 mPa·s, preferably 10 to 13 mPa·s, preferably 10.5 to 13 mPa·s, preferably 10.8 to 13 mPa·s.

Of course, the above properties are merely exemplary, and emulsions may be demulsified that contain crude oils having an API gravity, a density, and/or a viscosity outside of these ranges.

The use of the POFA demulsifiers of the present disclosure is not limited to crude petroleum oil emulsions, but extends to the breaking of any hydrocarbon emulsion, such as those derived from refined mineral oil, gasoline, kerosene, and the like.

The emulsions may be formed from various natural and/or synthetic emulsifiers/surfactants. In the case of crude oil, in addition to the presence of natural emulsifiers like asphaltenes and resins, the emulsion may optionally contain other surfactants commonly employed during oil and gas operations. Thus methods of the present disclosure may be performed on emulsions that optionally contain one or more of a cationic, anionic, non-ionic, and/or amphoteric surfactant.

Cationic surfactants may include, but are not limited to
a protonated amine formed from a reaction between a $C_6$-$C_{26}$ alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of $C_6$-$C_{26}$ alkyl monoamines, $C_6$-$C_{26}$ alkyl (poly)alkylene polyamines, and alkoxylated fatty amines;

a protonated $C_6$-$C_{26}$ alkyl amidoamine formed from a reaction between a $C_6$-$C_{26}$ alkyl amidoamine compound and an acid (for example the acids listed above), such as protonated forms of the amide reaction product between any fatty acid previously listed (or ester derivative thereof) with a polyamine (e.g., putrescine, cadaverine, ethylene diamine, $N^1,N^1$-dimethylethane-1,2-diamine, $N^1,N^1$-dimethylpropane-1,3-diamine, $N^1,N^1$-diethylethane-1,2-diamine, $N^1,N^1$-diethylpropane-1,3-diamine, spermidine, 1,1,1-tris(aminomethyl) ethane, tris(2-aminoethyl)amine, spermine, TEPA, DETA, TETA, AEEA, PEHA, HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, etc.) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with specific mention being made to a tri-fatty alkyl lower alkyl ammonium compound (e.g., trioctyl methyl ammonium chloride), a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride (for example those disclosed in CN101544903B—incorporated herein by reference in its entirety);

as well as mixtures thereof.

Anionic surfactants may include, but are not limited to:

sulfates, such as alkyl sulfates, alkyl-ester-sulfates, alkyl ether sulfates, alkyl-alkoxy-ester-sulfate, sulfated alkanolamides, glyceride sulfates, in particular, sulfates of fatty alcohols or polyoxyalkylene ethers of fatty alcohols such as sodium dodecyl sulfate, sodium laureth sulfate, ammonium lauryl sulfate, potassium lauryl sulfate, sodium myreth sulfate;

sulfonates such as alkyl sulfonates, fatty alkyl-benzene sulfonates, lower alkyl-benzene sulfonates, alpha olefin sulfonates, lignosulfonates, sulfo-carboxylic compounds, for example, dodecyl benzene sulfonate, dioctyl sodium sulfosuccinate, perfluorooctanesulfonate (PFOS), perfluorobutanesulfonate;

phosphates such as alkyl aryl ether phosphates, alkyl ether phosphates, phosphates of fatty alcohols or polyoxyalkylene ethers of fatty alcohols such as cetyl phosphate salts, dicetyl phosphate salts, ceteth-10-phosphate salts;

carboxylate salts of fatty acids, acylamino acids, lactylates, and/or fatty alcohols/polyoxyalkylene ethers of fatty alcohols such as sodium stearate, vegetable oil-based anionic surfactants (e.g., palm oil anionic surfactant), sodium behenoyl lactylate, sodium isostearoyl lactylate, sodium caproyl lactylate, sodium laureth-5 carboxylate, sodium laureth-6 carboxylate, sodium laureth-11 carboxylate;

and mixtures thereof.

Non-ionic surfactants may include, but are not limited to:

amides or alkanolamides of fatty acids, that is, amide reaction products between a fatty acid and an amine or alkanolamine compound, such as coconut fatty acid monoethanolamide (e.g., N-methyl coco fatty ethanol amide), coconut fatty acid diethanolamide, oleic acid diethanolamide, palm based oleylamine, and vegetable oil fatty acid diethanolamide;

alkoxylated alkanolamides of fatty acids, preferably ethoxylated and/or propoxylated variants of the alkanolamides of fatty acids using for example anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide);

amine oxides, such as N-cocoamidopropyl dimethyl amine oxide and dimethyl $C_6$-$C_{22}$ alkyl amine oxide (e.g., dimethyl coco amine oxide);

fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters;

ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11 ceteareth-15, ceteareth-16, ceteareth-17 ceteareth-18 ceteareth-20 ceteareth-23 ceteareth-25 ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols;

alkyl polyglycosides (APGs) such as those made from reaction between fatty alcohols and glucose;

and mixtures thereof.

Amphoteric surfactants may include, but are not limited to:

$C_6$-$C_{22}$ alkyl dialkyl betaines, such as fatty dimethyl betaines (R—N($CH_3$)$_2$($^+$)—$CH_2COO^-$), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium);

$C_6$-$C_{22}$ alkyl amido betaines (R—CO—NH—$CH_2CH_2CH_2$—N($CH_3$)$_2$($^+$)—$CH_2COO^-$ or R—CO—NH—$CH_2CH_2$—N($CH_3$)$_2$($^+$)—$CH_2COO^-$), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine;

$C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N($CH_3$)$_2$($^+$)—$CH_2CH_2CH_2SO_3^-$ or R—CO—NH—$CH_2CH_2CH_2$—N($CH_3$)$_2$($^+$)—$CH_2CH_2CH_2SO_3^-$ or R—CO—NH—$CH_2CH_2$—N($CH_3$)$_2$(+)—$CH_2CH_2CH_2SO_3^-$) or a hydroxysulfonic group (R—N($CH_3$)$_2$($^+$)—$CH_2CH(OH)$—$CH_2SO_3^-$ or R—CO—NH—$CH_2CH_2CH_2$—N($CH_3$)$_2$($^+$)—$CH_2CH(OH)$—$CH_2SO_3^-$ or R—CO—NH—$CH_2CH_2$—N($CH_3$)$_2$(+)—$CH_2CH(OH)$—$CH_2SO_3^-$), such as $C_{10}$-$C_{18}$ dimethyl hydroxysultaine and $C_{10}$-$C_{18}$ amido propyl dimethylamino hydroxysultaine;

and mixtures thereof.

In some embodiments, the only surfactant/emulsifier present in the emulsions herein are the natural surfactants/emulsifiers found in crude oil, namely asphaltene and crude oil resins.

The emulsions that can be treated according to the methods herein may be stable emulsions, i.e., that remain emulsions upon standing for more than 4 weeks, or more than 5 weeks, or more than 6 weeks, or more than 7 weeks, or more than 8 weeks, or more than 9 weeks, or more than 10 weeks, without any noticeable phase separation. Of course, less stable emulsions may also be demulsified according to the disclosed methods.

Demulsification

The methods of the present disclosure enable various oil and water emulsions to be separated into respective aqueous and oil phases. In preferred embodiments, the methods are performed on crude oil emulsions (e.g., water-in-crude oil emulsions), where the oil phase (crude oil) can be separated/collected and subject to additional refining/upgrading/processing, if desired. Therefore, the following description is mainly in reference to the demulsification of crude oil emulsions, but the basic concepts may be applied to other types of oil and water emulsions.

Addition of the palm oil fuel ash (POFA) demulsifier to the crude oil emulsion may be accomplished in a number of ways, including using standard demulsification processes common to oil/gas field demulsifiers, such as processes that employ POLOXAMER 407. In some embodiments, the POFA is added to the oil well tubing at or ahead of the choke on a flowing well or at or ahead of the pump on a pumping well. In some embodiments, the POFA is introduced at a point in the pipeline between the well-head and a storage tank or a separation unit, preferably as the emulsion is in a state of flow. In some embodiments, the POFA is added to the emulsion within a storage tank or a separation unit. In some embodiments, POFA is introduced downhole as the crude oil is being brought to the surface. Use of the POFA demulsifiers beneath the surface in the oil well itself, either continuously or periodically in either diluted or undiluted form, can be accomplished in order to effect dispersion of the POFA throughout the emulsion, so that upon obtaining the crude petroleum oil emulsion at the surface, separation into aqueous and oil phases can be accomplished without the additional step of incorporating the demulsifier subsequent to the withdrawal of the crude petroleum oil from the well. In preferred embodiments, the palm oil fuel ash is added to the emulsion downstream of the well and upstream of a storage tank or a separation unit.

The palm oil fuel ash may be added to the emulsion as a powder (solid) or as a solution, suspension, or slurry, for example by dissolving, suspending, or slurrying the POFA in water and/or an appropriate organic solvent. The palm oil fuel ash and any optional additives (e.g., secondary demulsifier, organic solvent, etc.) may be added to the emulsion using any addition/dosing/mixing techniques known by those of ordinary skill in the art, including both manual and automatic addition techniques. For example, the addition may be carried out by using inline static mixers, inline mixers with velocity gradient control, inline mechanical mixers with variable speed impellers, inline jet mixers, motorized mixers, batch equipment, and appropriate chemical injection pumps and/or metering systems such as solids handling pumps or proportionating pumps. The chemical injection pump(s) can be automatically or manually controlled to add any amount of palm oil fuel ash needed for adequate phase separation/demulsification.

The addition of POFA may be performed under static conditions, whereby the emulsion is in a static state during the addition, followed by agitation using any of many known large volume mixing devices. Alternatively, the addition may be performed under conditions of flow, whereby the emulsion is placed in a flow state, and the POFA is added into the flowing emulsion. For example, a pumping system can be provided to cycle the emulsion through one or more mixing stations where the POFA and any optional additives are added as it circulates through the pump.

The POFA demulsifier of the disclosure can be used in both batch and continuous processes for demulsification of crude petroleum oil.

When treated, the emulsion may have a temperature anywhere from ambient temperature and up to the crude oil production temperature. The temperature of the emulsion can be controlled by temperature control equipment, or may be dependent upon where in the crude oil production process the POFA demulsifier is added. For example, addition of POFA downhole may place the emulsion at a higher temperature than if the POFA were to be added above hole, e.g., during transportation to a storage tank or separation unit. In some embodiments, the emulsion may have a temperature of 20 to 90° C., preferably 30 to 80° C., preferably 40 to 75° C., preferably 50 to 70° C., preferably 55 to 65° C., preferably about 60° C.

After addition, the emulsion that has been treated with the palm oil fuel ash may be allowed to stand in a quiescent state until the desired separation into distinct layers of water and oil results. Generally, the time for separation or stratification of the layers of water and oil is 5 to 60 minutes, preferably 10 to 50 minutes, preferably 20 to 40 minutes.

Preferably, after addition of POFA, the emulsion may be agitated to disperse the POFA particles throughout the continuous phase (e.g., the oil), which tends to afford phase separation at an accelerated rate. With agitation, separation into an aqueous phase and an oil phase may occur in 30 seconds to 10 minutes, preferably 1 to 8 minutes, preferably 2 to 7 minutes, preferably 3 to 6 minutes, preferably 4 to 5 minutes. With the application of agitation, demulsification generally proceeds quickly enough, even at the oil production temperature, for the emulsion to separate en route to the separation stage.

Agitation techniques that may be employed herein, include, but are not limited to, mechanical stirring, mixing, sonication (e.g., ultrasonication), swirling, and circulation techniques. In some embodiments, the methods may be performed with the aid of a tank, where, generally a volume of emulsified oil in a tank is admixed with the POFA demulsifier by suitable agitation. Exemplary tanks include, but are not limited to, mixing tanks (e.g., slow mix tanks, swirl tanks), skim tanks, settling tanks, and holding tanks. Adequate dispersion of the POFA demulsifier in the crude petroleum oil can also be accomplished by use of a circulating pump which withdraws a portion of the crude petroleum oil emulsion from the tank and reintroduces it, for instance, into the top of the tank. In this procedure, the POFA can be added at the suction side of the circulating pump, for example.

Heat (e.g., 60 to 80° C.) and/or pressure changes (e.g., pressure reduction) may also be optionally applied during agitation to enhance the dispersion of the POFA particles throughout the continuous phase of the emulsion.

The above described methods preferably result in the separation of the oil and water into distinct phases (oil phase on top of the aqueous phase). More preferably, any solids present (e.g., POFA solids) settle on the bottom of the water layer.

Once separation of water and crude petroleum oil into distinct layers has been effected, various means can be utilized for withdrawing/separating crude petroleum oil from the aqueous phase that lies beneath. Separation may be accomplished using any means capable of liquid-liquid separation (oil-water separation) or liquid-liquid-solid (oil-water-solids) separation. Any separation device or system known to those of ordinary skill in the art may be utilized herein, including multiple separation devices, either in parallel or series, to achieve the desired separation and crude oil quality. Such separation devices/systems may include, but are not limited to, gravity oil separators (API separators), plate separators or coalescing plate separators, separatory funnels, settling tanks, centrifugal separation (e.g., centrifugal water-oil separators, centrifugal settling devices, dewatering centrifuges), decanters, induced gas floatation such using microbubble technology, and skimming equipment.

In preferred embodiments, the methods herein provide an oil phase such as crude oil which is substantially free of water, and is also substantially free of demulsifiers (e.g., palm oil fuel ash) utilized during processing.

The method may further involve separating the settled solid particles of palm oil fuel ash from the aqueous phase, removing oil droplets that remain in the aqueous phase (e.g., oil droplets smaller than 150 µm), and/or otherwise removing or treating any other dissolved materials and/or contaminants from the aqueous phase so that it can be safely discharged or reused. Any solid-liquid separation device/system or other treatment system may be used, including, but not limited to, a dissolved air flotation (DAF) device; an induced air flotation (IAF) device; a settling tank; a flocculation device using induced velocity gradients generated from baffled chambers, granular media beads, spiral flow chambers, reciprocating blades, and/or rotating blades; a centrifuge such as a stacked disc centrifuge, a horizontal solid bowl centrifuge, a decanter, a tricanter; a recessed chamber filter press; a rotary drum vacuum filter or other vacuum filter; a belt press; a pressure filter; a membrane filtration device; anaerobic and aerobic biological treatment; parallel plate separators; a hydrocyclone; walnut shell filters; and media filters.

Of course, the chemical demulsification methods herein may be used in combination with other separation and treatment processes known to those of ordinary skill in the art, including, but not limited to, thermal treatment, pH adjustment, electrostatic demulsification (e.g., using vessel internal electrostatic coalescers), freeze/thaw methods, microwave radiation, ultrasonic energy, and hydrocyclone-based techniques etc.

A typical process for demulsification of crude oil is provided by way of example: A reservoir is provided to hold the emulsion in either diluted or undiluted form adjacent to the point where the effluent crude petroleum oil leaves the well. For convenience the reservoir is connected to a proportioning or solids handling pump capable of dosing/metering the POFA demulsifier into the crude oil emulsified fluids leaving the well which then pass through a flow line into a settling tank. Agitation is provided by the flowing emulsion, which is generally sufficient to disperse the POFA particles throughout the emulsion. Generally, the emulsified fluids pass into the settling tank at the bottom of the tank so that incoming fluids do not disturb stratification of the layers of crude petroleum oil and water which takes place during the course of demulsification.

In some embodiments, after the addition of POFA, the emulsions have a viscosity (e.g., measured 250 seconds to 1,500 seconds after POFA has been added at 25° C.) of 0.05 to 1 Pa·s, preferably 0.1 to 0.8 Pa·s, preferably 0.2 to 0.6 Pa·s, preferably 0.3 to 0.4 Pa·s. At the same time interval, without the addition of POFA, the emulsion may have a viscosity of 1.5 to 2 Pa·s, preferably 1.6 to 1.9 Pa·s, preferably 1.7 to 1.8 Pa·s.

In some embodiments, after the addition of POFA, the emulsions have an interfacial tension (e.g., measured up to 160 seconds after POFA has been added at 23° C.) of 17 to 23 mN/m, preferably 18 to 22 mN/m, preferably 19 to 21 mN/m. At the same time interval, without the addition of POFA, the emulsion may have an interfacial tension of 30 to 34 mN/m, preferably 31 to 33 mN/m, preferably about 32 mN/m.

In some embodiments, the methods described herein achieve a demulsification efficiency (DE) at 60° C., defined as a volume (V) of the aqueous phase (water) separated from the oil phase divided by an initial volume of water present in the emulsion ($V_0$) multiplied by 100 (i.e., DE (%)=[V/$V_o$]×100), of 85 to 99.9%, preferably 86 to 99.5%, preferably 87 to 99%, preferably 88 to 98%, preferably 89 to 97%, preferably 90 to 96%, preferably 91 to 95%, preferably 92 to 94%.

The methods herein do not preclude introduction of other known chemical treatments into oil and gas field production and downstream transportation, distribution, and/or refining systems, and thus the palm oil fuel ash demulsification procedures described herein may be used in conjunction with other chemical treatments known to those of ordinary skill in the art, including, but not limited to, viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic polymer gelling agents (e.g., polyacrylamides and co-polymers thereof, see U.S. Pat. No. 7,621,334—incorporated herein by reference in its entirety), psyllium husk powder, hydroxyethyl cellulose, carboxymethylcellulose, and polyanionic cellulose, poly(diallyl amine), diallyl ketone, diallyl amine, styryl sulfonate, vinyl lactam, laponite; chelating agents, such as chelating agents useful as sequeste ation agents of metal ions, for example iron control agents, such as ethylene diamine tetraacetic acid (EDTA), diethylene triatnine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-paramethyl phenyl acetic acid (EDDHMA), ethylene diamine di-ortho-hydroxy-para-carboxy-phenyl acetic acid (EDDCHA); stabilizing agents e.g., polypropylene glycol, polyethylene glycol, carboxymethyl cellulose, hydroxyethyl cellulose, polysiloxane polyalkyl polyether copolymers, acrylic copolymers, alkali metal alginates and other water soluble alginates, carboxyvinyl polymers, polyvinylpyrollidones, polyacrylates; dispersing agents e.g., polymeric or co-polymeric compounds of polyacrylic acid, polyacrylic acid/maleic acid copolymers, styrene/maleic anhydride copolymers, polymethacrylic acid and polyaspartic acid; scale inhibitors e.g., sodium hexametaphosphate, sodium tripolyphosphate, hydroxyethylidene diphosphonic acid, aminotris (methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and co-polymers thereof; defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts; hydrate inhibitors; corrosion inhibitors e.g., alkoxylated fatty amines, chromates, zinc salts, (poly)phosphates, organic phosphorus compounds (phosphonates), acetylenic alcohols such as propargylic alcohol, α,β-unsaturated aldehydes such as cinnameldehyde and crotonaldehyde, aromatic aldehydes such as furfural, p-anisaldehyde, phenones including alkenyl phenones such as phenyl vinyl ketone, nitrogen-containing heterocycles such as imidazolines, piperazines, hexamethylene tetramines, quaternized heteroarenes such as 1-(benzyl)quinolinium chloride, and condensation products of carbonyls and amines such as Schiff base; asphaltene inhibitors; paraffin inhibitors; $H_2S$ scavengers; $O_2$ scavengers; water clarifiers; and mixtures thereof.

The examples below are intended to further illustrate protocols for preparing the palm oil fuel ash and testing its ability to demulsify oil and water emulsions, are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Materials and Methods
Materials

The Arab light crude oil used in this study originates from one of oil fields in the Kingdom of Saudi Arabia (Uthmaniyah). The results of the physical characterization of this oil are shown in Table 1. The synthetic seawater (SW) was employed to prepare W/O emulsions. Table 2 depicts the composition of SW. Commercial salts used were NaCl, $Na_2SO_4$, $NaHCO_3$, $MgCl_2$, and $CaCl_2$. POFA was obtained from palm oil mill, United Oil Palm Industries Sdn. Bhd. in Nibong Tebal, Penang, Malaysia. The relatively moist raw POFA was dried in an oven at 100±5° C. The ash was ground using a mechanical ball mill containing 150 steel balls of various sizes ranging from 6 mm to 32 mm and rotating at speed of 180 rpm. This was performed to lower the POFA particle size and increase its surface area. Afterward, the grinding was followed by calcination at 550° C. in a gas-powered furnace for 90 min to remove unburnt carbon, reduce agglomeration of particles and prevent glassy phase crystallization.

TABLE 1

Physical parameters of the crude oil.

| Physical characterization/<br>mass percentage | Value |
| --- | --- |
| API specific gravity at 15° C. | 0.863 |
| API gravity at 15° C. | 32.490 |
| Density (g/cm³) at 15° C. | 0.8620 |
| Viscosity (mPa · s) at 15° C. | 10.9 |
| SARA fractions: | |
| Saturates (wt %) | 36.2 |
| Asphaltenes (wt %) | 2.785 |
| Resins (wt %) | 11 |
| Aromatics (wt %) | 50 |

TABLE 2

The composition of seawater (SW).

| Ions | Seawater (mg/L) |
| --- | --- |
| $Na^+$ | 18300 |
| $Ca^{2+}$ | 700 |
| $Mg^{2+}$ | 2100 |
| $SO_4^{2-}$ | 4300 |

TABLE 2-continued

The composition of seawater (SW).

| Ions | Seawater (mg/L) |
|---|---|
| Cl⁻ | 32200 |
| HCO₃⁻ | 100 |
| Total | 57700 |

Emulsification and Demulsification Techniques

The received crude oil sample was used directly without any further treatment. SW served as the aqueous phase and crude oil constitutes the oil phase in the preparation of W/O emulsions. In a 150 ml beaker containing 30 ml crude oil, 70 ml SW was added in a stepwise manner and mixed continuously using a Cole-Parmer mixer at room temperature (25° C.) at a speed of 1500 rpm until both phases appeared homogenous. The W/O emulsion formed constitute crude oil to SW volume ratio of 3:7. A conventional emulsifier was not used to stabilize the produced W/O emulsions. Asphaltenes and resins present in the crude oil sample acted as emulsifiers to result in a stable emulsion. The emulsions formed in this manner were stable for more than 8 weeks without any noticeable phase separation. Subsequently, 10 ml of the resulting emulsion was transferred in six separate 15 ml bottles. The content of one of these bottles served as a reference sample.

A schematic of the demulsification test is shown in FIG. 1. Various concentrations of POFA were employed: 1 wt %, 3 wt %, 5 wt %, 7 wt %, and 9 wt % were added to 10 mL of the W/O emulsion in separate 15 ml bottles and each sample was agitated for 1 minute. Following the agitation, each mixture was transferred into separate graduated cylinders and placed inside the oven at 60° C. in order to observe the oil/water separation. It should be noted that the emulsion without POFA served as a reference for proper comparison. Demulsification efficiency (DE) was determined by the percentage of water (in this case, SW) removed with respect to time using the formula shown in equation 1 (Nikkhah, M., Tohidian, T., Rahimpour, M. R., Jahanmiri, A., 2015, Efficient demulsification of water-in-oil emulsion by a novel nano-titania modified chemical demulsifier, Chem. Eng. Res. Des. 94, 164-172—incorporated herein by reference in its entirety):

$$DE(\%) = \left(\frac{V}{V_o}\right) \times 100 \quad (1)$$

Characterization

The particle sizes of POFA were analyzed by the Fristch laser, Analysette 22, MicroTec plus particle-size analyzer. X-ray diffraction (XRD) pattern of the POFA was examined by the Ultima IV model manufactured by Rigaku Co. Japan. The test was carried out with a scan speed of 2.5 deg/min in the range of 10 to 80 degrees. X-ray fluorescence (XRF) was used to determine the chemical composition of POFA. Emulsion's structure before and after demulsification was analyzed by the high-resolution microscope Leica DM2000 equipped with a long-life light-emitting diode (LED).

Rheology Measurements

All measurements were performed using the discovery hybrid rheometer manufactured by TA Instruments. The concentric cylinder geometry was used in all the tests conducted and the sample volume for every test was 20 mL. As the emulsions were prepared at room temperature, viscosity and shear stress were determined as a function of shear rate at 25° C. in order to check the stability of emulsions produced (Hippmann, S., Ahmed, S. S., Fröhlich, P., Bertau, M., 2018, Demulsification of water/crude oil emulsion using natural rock Alginite, Colloids Surfaces A Physicochem. Eng. Asp. 553, 71-79—incorporated herein by reference in its entirety). Demulsification efficiency of POFA was examined by measuring the viscosity and elastic modulus behavior of the emulsions at 60° C. before and after POFA addition. Angular frequency, strain, and shear rate were fixed at 1.5 Hz, 5%, and 1 s⁻¹, respectively, during the viscosity and elastic modulus time sweep measurements.

Interfacial Tension Measurements

The interfacial tension (IFT) equipment manufactured by the Biolin Scientific Company was employed to measure the IFT between crude oil and colloidal POFA containing solution. During the experiment, approximately 26 μL of crude oil was carefully released from the capillary tube onto the tip of a J-shaped needle that was dipped in the colloidal POFA solution. All the reported IFT values are obtained at equilibrium. Additionally, IFT of crude oil/water in the absence of POFA was conducted as a blank test for comparison. All experiments were performed at 23° C. and repeated twice to check the reproducibility.

Results and Discussion

Characterization of POFA and W/O Emulsions

Figure 2:
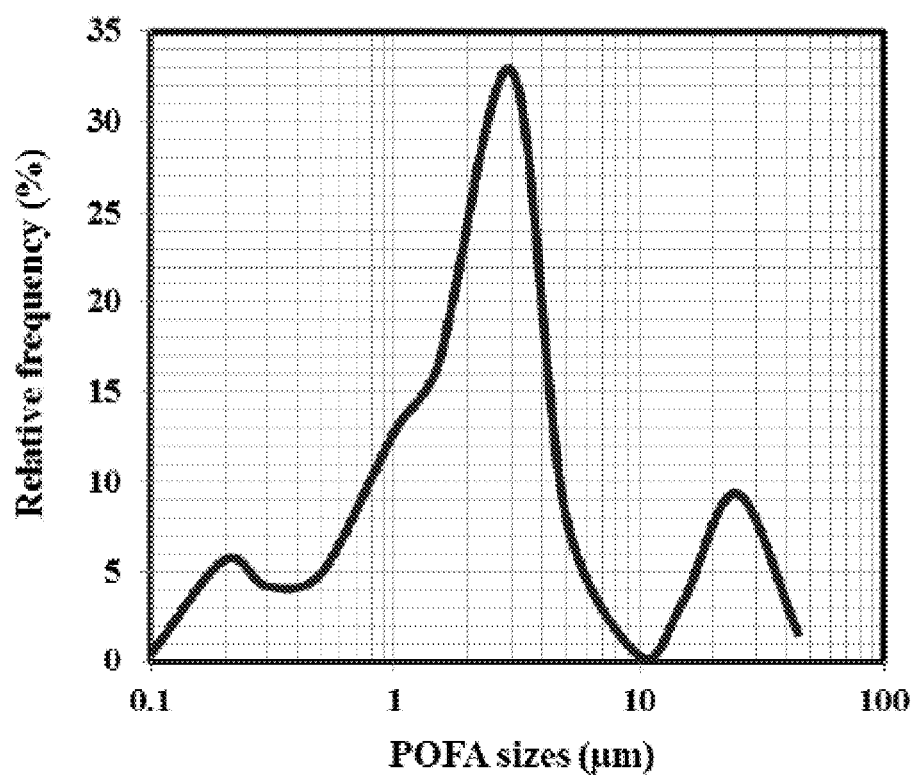
FIG. 2 is a graph illustrating the particle size distribution of POFA.
Figure 3:
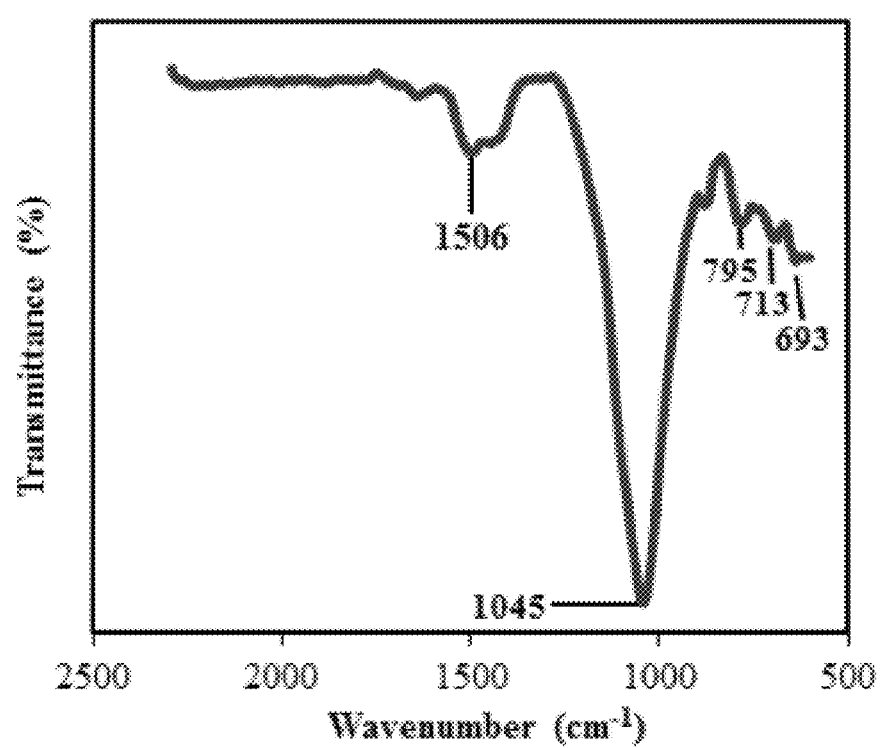
FIG. 3 is a graph illustrating the FTIR spectrum of a POFA sample.

FIG. 2 shows the particle size distributions of POFA used in this study. Its size was predominantly within the range of 0.1-10 μm while a minor fraction fell within 10.1-45 μm. The XRF analysis shown in Table 3 revealed the composition of the oxides in POFA. It is evident that silica ($SiO_2$) is the most abundant oxide of POFA. The remaining oxides constitute a very small proportion. FIG. 3 shows the IR spectrum of POFA and enables the identification of the functional groups of the compounds in POFA. Absorbance bands that were observed around 1045, 795, 713, 693 cm⁻¹ in the spectrum correspond to the siloxane (Si—O—Si) bonds asymmetric and symmetric vibrations. See Hasan, R., Chong, C. C., Setiabudi, H. D., Jusoh, R., Jalil, A. A., 2019, Process optimization of methylene blue adsorption onto eggshell-treated palm oil fuel ash, Environ. Technol. Innov. 13, 62-73; Mijarsh, M. J. A., Megat Johari, M. A., Ahmad, Z. A., 2014, Synthesis of geopolymer from large amounts of treated palm oil fuel ash: Application of the Taguchi method in investigating the main parameters affecting compressive strength, Constr. Build. Mater. 52, 473-481—each incorporated herein by reference in their entirety. The band at 1506 cm-1 is believed to be associated with the asymmetric vibration mode of the O—C—O bonds.

Figure 4A:
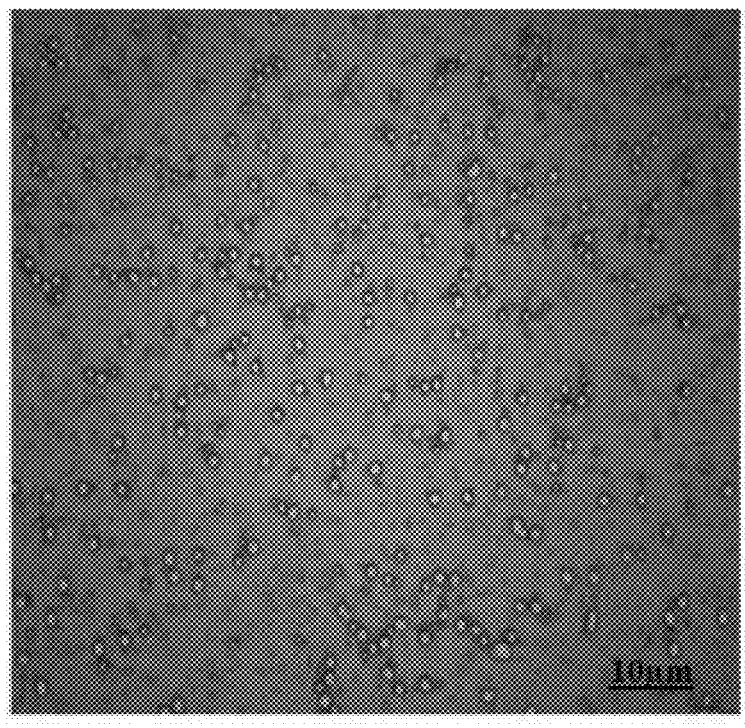
FIGS. 4A and 4B are an optical image of a W/O emulsion formed and a graph charting the viscosity and shear stress behavior of the W/O emulsion, respectively.
Figure 4B:
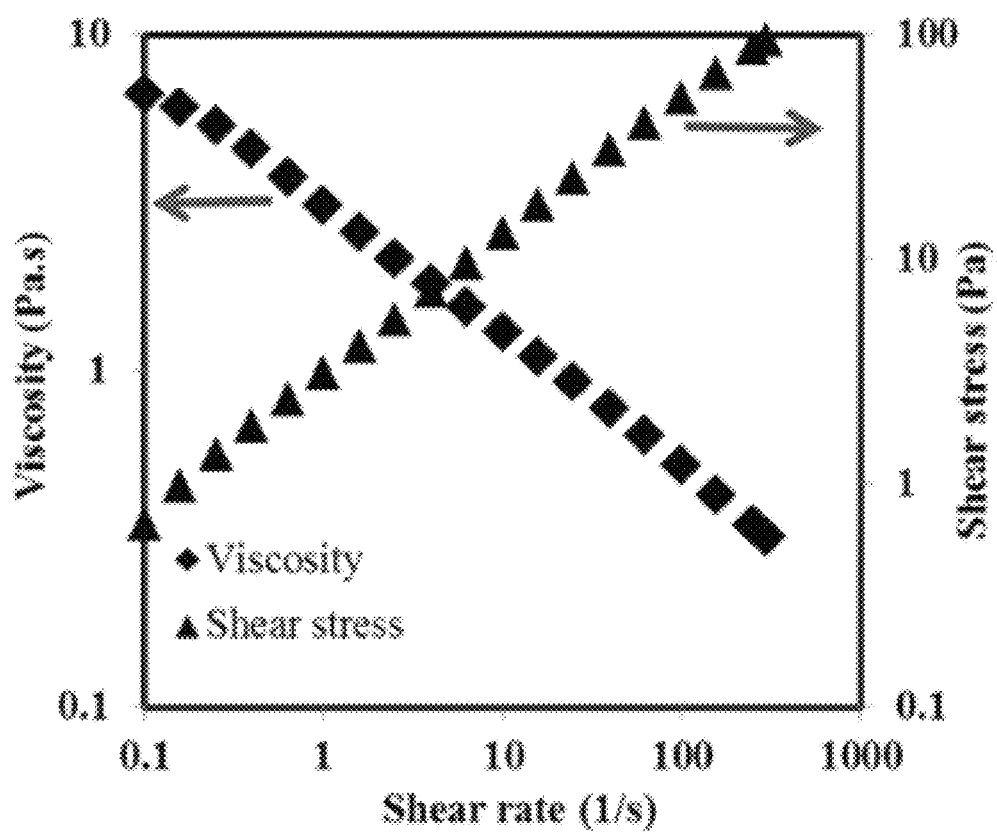

The produced W/O emulsions were stable at room temperature (25° C.) for more than 8 weeks without any noticeable phase separation. FIG. 4A shows the water droplets dispersed in the oil phase. According to the droplet size analysis, the water droplet size varies within 3-20 μm. In addition to the drop size investigation, rheology has proven to be a reliable technique to describe emulsion stability (Hippmann, S., Ahmed, S. S., Fröhlich, P., Bertau, M., 2018, Demulsification of water/crude oil emulsion using natural rock Alginite, Colloids Surfaces A Physicochem. Eng. Asp. 553, 71-79—incorporated herein by reference in its entirety). FIG. 4B indicates that the shear stress was increasing with increasing shear rate. This implies that the emulsion is following shear thinning behavior. On the other hand, over a shear rate range from 0.1 ro300 s⁻¹, the viscosity fell drastically with increasing shear rate.

TABLE 3

| | The constituent oxides of POFA. | | | | | | | | |
|---|---|---|---|---|---|---|---|---|---|
| Component | $SiO_2$ | $Al_2O_3$ | $Fe_2O_3$ | CaO | MgO | $Na_2O$ | $K_2O$ | $SO_3$ | LOI |
| POFA (% wt) | 66.91 | 6.44 | 5.72 | 5.56 | 3.13 | 0.19 | 5.2 | 0.33 | 2.3 |

Demulsification Performance of POFA

Figure 5:
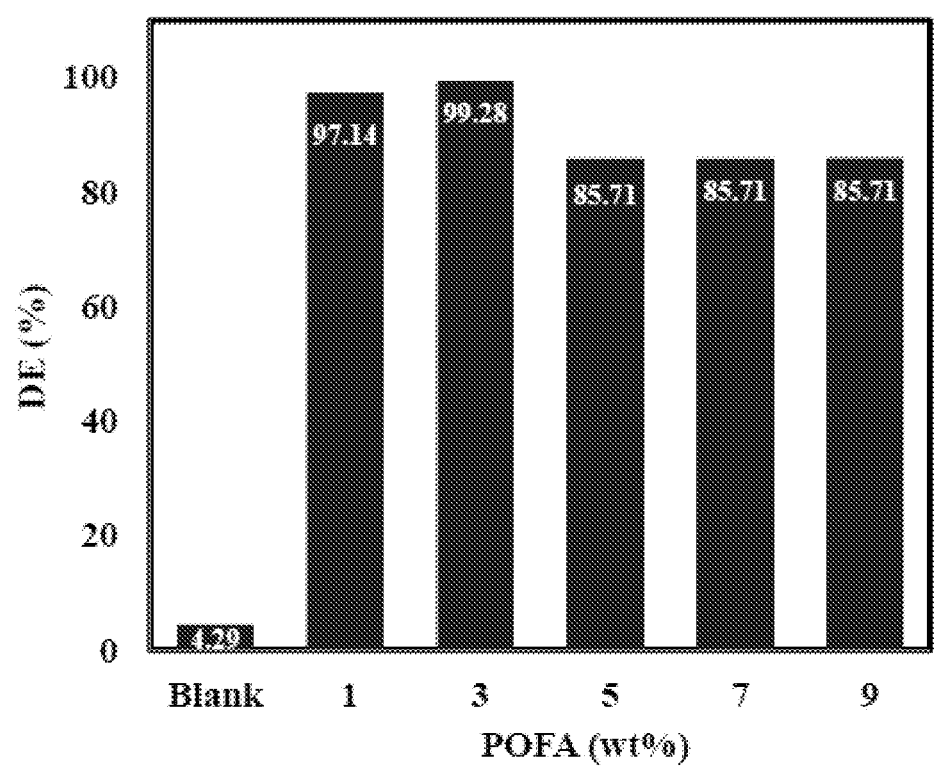
FIG. 5 is a graph illustrating the demulsification efficiency of POFA at various concentrations.

The demulsification efficiency (% DE) for the blank sample and the emulsions containing various concentrations of POFA is depicted in FIG. 5. The water/oil phase separation lasted for 30 minutes and then remained constant in the case of blank sample. As for the POFA containing samples, the emulsion with 3 wt % POFA showed the fastest water/oil separation after 5 minutes, followed by the emulsion containing 1 wt % POFA, in which the water/oil separation took 6 minutes while it took 8 minutes for water and oil to separate in the case of emulsion samples containing 5, 7, and 9 wt % POFA. As can be seen in FIG. 5, the W/O emulsion with 3 wt % POFA achieved the highest water/oil separation (99.28% DE). An emulsion containing 1 wt % POFA achieved 97.14% DE while emulsions filled with 5, 7 and 9 wt % POFA demonstrated virtually identical water/oil separation (85.71% DE).

Figure 6:
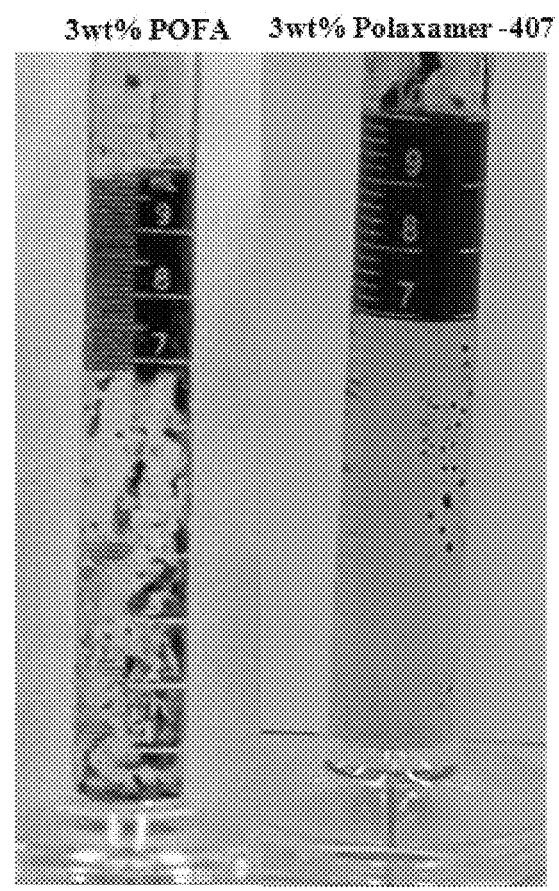
FIG. 6 illustrates the comparison between POFA and a commercial demulsifier (POLOXAMER 407), each at a dosage of 3 wt. %.
Figures 7A, 7B, 7C:
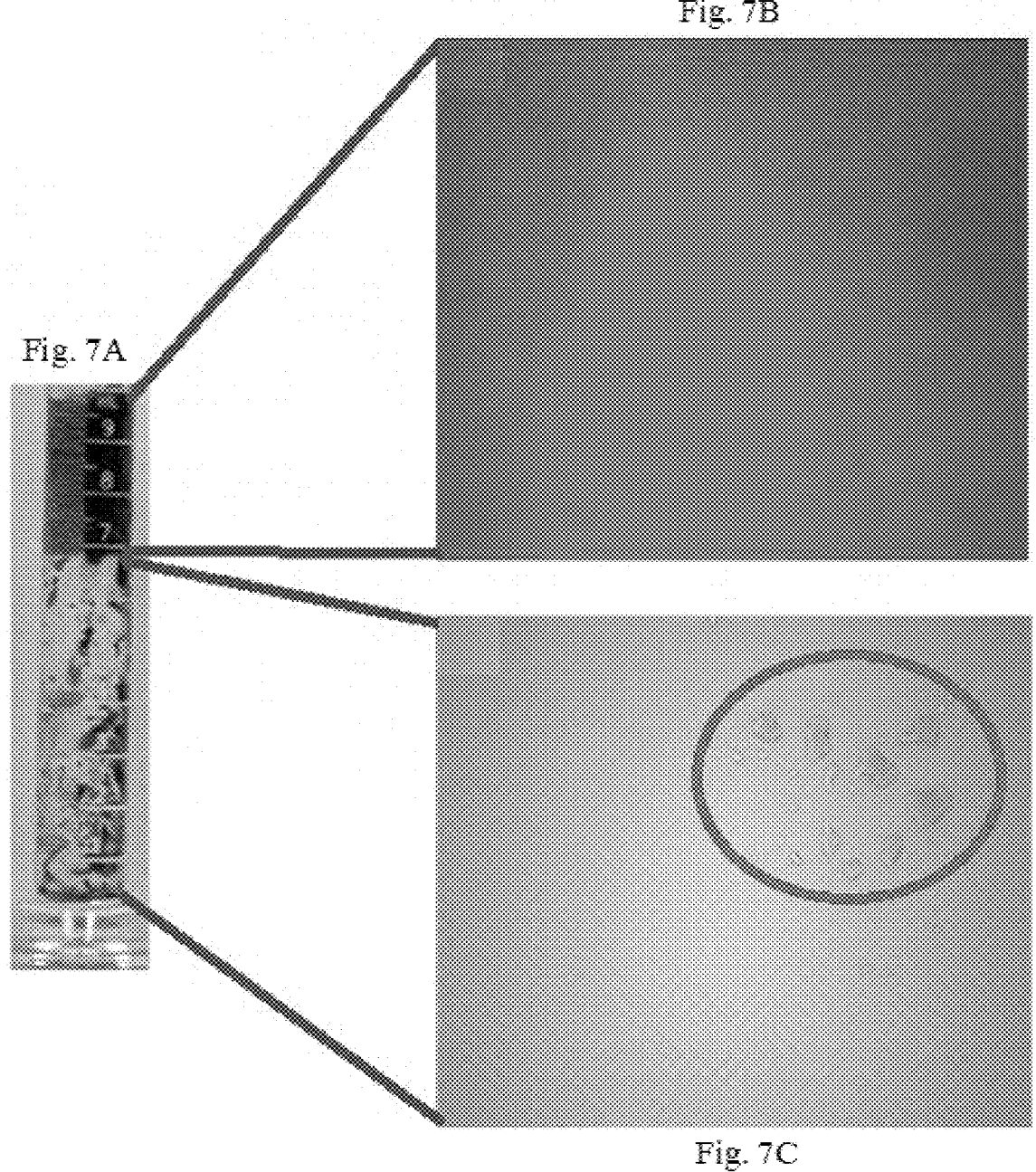
FIGS. 7A-7C show an image of a broken emulsion resulting from 3 wt. % POFA (FIG. 7A) and a micrograph illustrating the oil phase (FIG. 7B) and water phase (FIG. 7C) after demulsification.

The demulsifying performance of POFA was compared with a well-known commercial demulsifier called POLOXAMER 407. A test was conducted with 3 wt % POLOXAMER 407 in an attempt to break a W/O emulsion at 60° C. FIG. 6 shows the water/oil separation between 3 wt % POFA exhibiting the best water removal and 3 wt % POLOXAMER 407. The water removing capacities of 3 wt % POFA and 3 wt % POLOXAMER 407 is 99.28% and 99.51%, respectively (Table 4). Certainly, because POFA competes quite easily with POLOXAMER 407, it will be able to compete effectively with other demulsifiers used in the petroleum industry. In contrast to for example POLOXAMER 407, removing POFA after the demulsification step is very easy because it settles rapidly in the water phase. To gain further insight into the POFA-triggered demulsification, the morphology of water/oil separated from the 3 wt % POFA (image shown in FIG. 7A) was examined under the electron microscope. FIG. 7B depicts the microscopic image of the oil phase in the absence of any noticeable water droplets. Conversely, FIG. 7C indicates the image of water separated from the W/O emulsion. The portion of the image circled in red in FIG. 7C connotes that there are still oil floccules trapped in the separated water.

TABLE 4

Demulsification efficiency comparison of POFA to commercial demulsifier

| Demulsifier Concentration | Temperature (° C.) | % DE |
|---|---|---|
| 3 wt. % POFA | 60 | 99.28 |
| 3 wt. % POLOXAMER 407 | 60 | 99.51 |

Viscosity and Elastic Behavior of W/O Emulsion

Figure 8A:
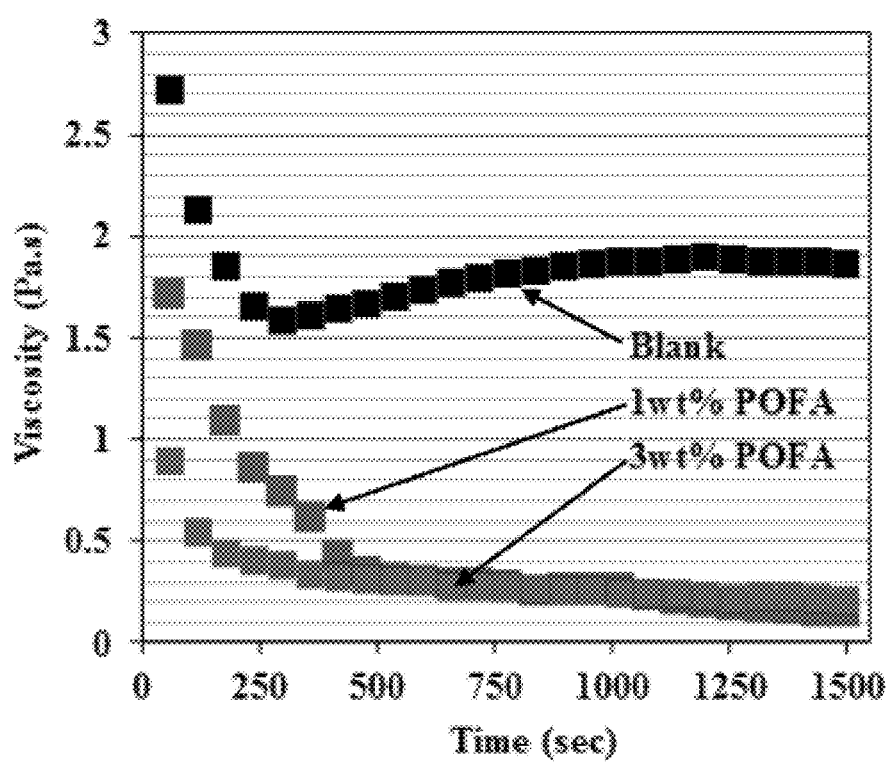
FIGS. 8A and 8B are graphs illustrating the W/O emulsion behavior before and after POFA addition.

The essence of employing demulsifying agents is to replace the emulsifying substances, usually asphaltenes and resins at the water/oil interface. This process will influence the interfacial film between water and oil; it becomes very thin and eventually collapses, leading to coalescence and viscosity reduction. See Al-Sabagh, A. M., Nasser, N. M., Abd El-Hamid, T. M., 2013, Investigation of Kinetic and Rheological Properties for the Demulsification Process, Egypt. J. Pet. 22, 117-127; Hippmann, S., Ahmed, S. S., Fröhlich, P., Bertau, M., 2018, Demulsification of water/crude oil emulsion using natural rock Alginite, Colloids Surfaces A Physicochem. Eng. Asp. 553, 71-79, each incorporated herein by reference in their entirety. This behavior can be monitored by measuring the viscosity of the emulsion as a function of time. Ideally, an effective and efficient demulsifier will reduce the viscosity of a water-crude oil emulsion. In this manner, the efficiency of POFA as a potential demulsifier was examined via the viscosity-time sweep measurement. Since the demulsification tests were performed at a temperature of 60° C., bulk rheology tests were conducted at the same temperature. FIG. 8A shows the viscosity versus time profile of W/O emulsions without (blank) and with POFA. As can be noticed in these plots, the addition of 1 wt % and 3 wt % POFA to the emulsions led to viscosity reduction; this was observed to be drastic for the first 350 seconds in the case of the emulsion containing 1 wt % POFA and for the first 300 seconds in the case of an emulsion containing 3 wt % POFA. The viscosity-time profile of W/O emulsions without demulsifier was seen to attain significantly higher viscosity values. These results signify that the disperse phase (water) is being deformed. Similar investigations by Al-Sabagh et al. (Al-Sabagh, A. M., Nasser, N. M., Abd El-Hamid, T. M., 2013, Investigation of Kinetic and Rheological Properties for the Demulsification Process, Egypt. J. Pet. 22, 117-127—incorporated herein by reference in its entirety) and Hippmann et al. (Hippmann, S., Ahmed, S. S., Fröhlich, P., Bertau, M., 2018, Demulsification of water/crude oil emulsion using natural rock Alginite, Colloids Surfaces A Physicochem. Eng. Asp. 553, 71-79—incorporated herein by reference in its entirety) have affirmed that water clusters become larger (due to deformation) until the water gets separated from the oil, leading to a time-dependent change in the viscosity.

Figure 8B:
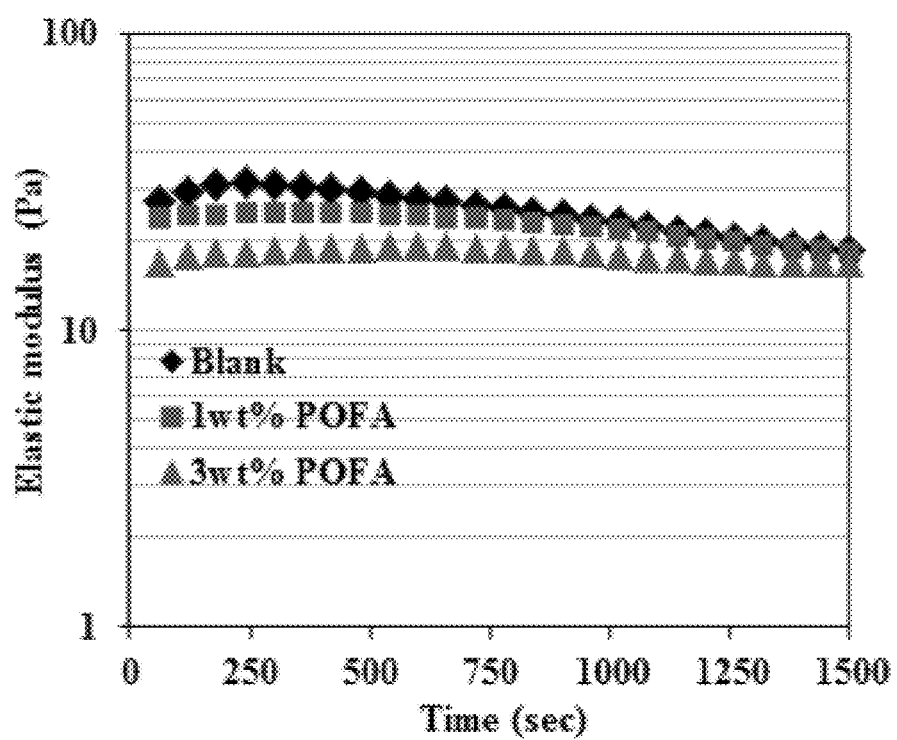

To corroborate the demulsifying potential of POFA, its effect was examined on the elastic behavior of W/O emulsions and comparison was made with the emulsion without POFA. It should be noted that an effective demulsifier should be the one that can reduce the elasticity at the interface. Incorporation of a good demulsifier should therefore retard the elastic modulus of a crude oil emulsion considerably (Pensini, E., Harbottle, D., Yang, F., Tchoukov, P., Li, Z., Kailey, I., Behles, J., Masliyah, J., Xu, Z., 2014, Demulsification mechanism of asphaltene-stabilized water-in-oil emulsions by a polymeric ethylene oxide-propylene oxide demulsifier, Energy and Fuels 28, 6760-6771—incorporated herein by reference in its entirety). FIG. 8B depicts the elastic modulus versus time for W/O emulsions in the absence and presence of POFA. It is conspicuous from these plots that the elastic modulus of POFA free-emulsion (blank) was practically higher than the emulsions charged with 1 wt % and 3 wt % POFA. The elastic modulus of the emulsions reduced considerably in the presence of POFA. The reduction became more obvious at 3 wt %. Clearly, the addition of POFA to water-crude oil emulsion collapsed the emulsifying substances (usually asphaltenes and resins) responsible for keeping the water/oil molecules together at the interface. Observations from the viscosity and elastic modulus time sweep measurements of W/O emulsion before and after POFA incorporation supports the demulsification bottle test results and also prove that POFA can work effectively and efficiently towards achieving excellent water removal from crude oil emulsions.

Interfacial Tension at the Oil/Water Interface

Figure 9:
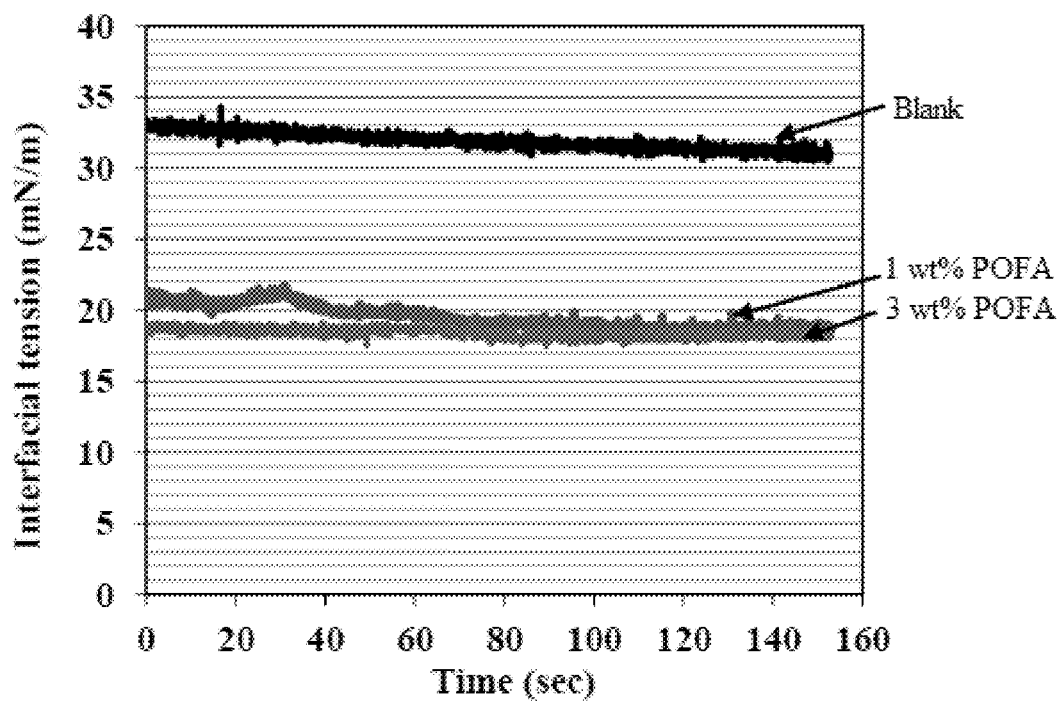
FIG. 9 is a graph illustrating the interfacial tension (IFT) between crude oil and water with and without POFA as a function of time.

FIG. 9 shows the IFT of water-crude oil with and without POFA addition. The oil/water IFT decreased significantly in the presence of 1 wt % and 3 wt % POFA solutions as compared to the IFT without POFA (blank test). According to these plots, POFA colloidal solutions has great tendency to decrease the water/oil IFT, suggesting that POFA particles can penetrate the interfacial films existing between crude oil and water. See Tao, J., Shi, P., Fang, S., Li, K., Zhang, H., Duan, M., 2015, Effect of rheology properties of oil/water interface on demulsification of crude oil emulsions, Ind. Eng. Chem. Res. 54, 4851-4860—incorporated herein by reference in its entirety. More importantly, the IFT results also corroborate the rheology experiments. The effective reduction in the viscosity and elastic modulus as seen in FIGS. 8A and 8B correlates the penetration of POFA particles within the interfacial films around the crude oil and water phases.

Proposed Demulsification Mechanism

Figure 10:
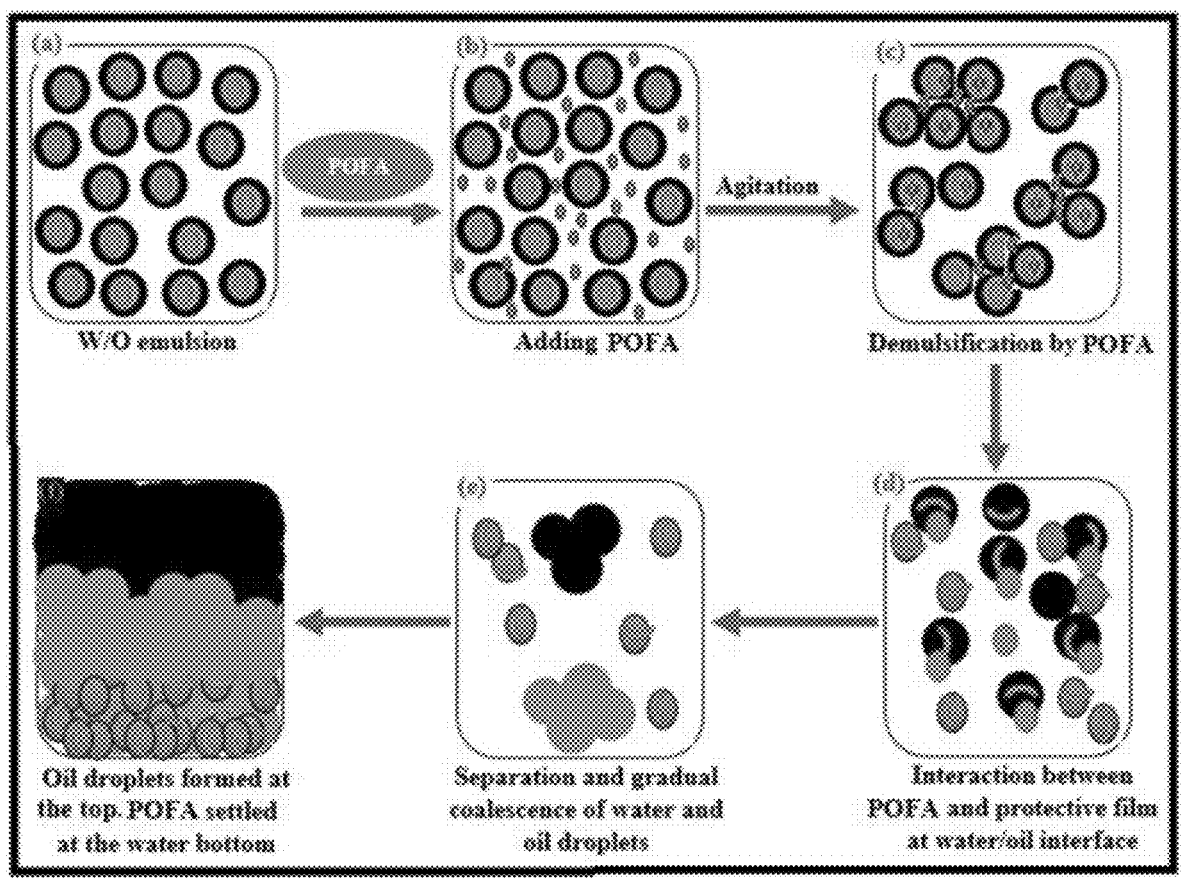
FIG. 10 illustrates the proposed mechanism illustrating the W/O emulsion destabilization using POFA as a demulsifier.

It is well known that the stability of W/O emulsion is related to the cohesive force existing between the oil droplets and the shielding films at the oil/water interface consisting of molecules such as resins and asphaltenes (FIG. 10-a). See Liu, J., Li, X., Jia, W., Li, Z., Zhao, Y., Ren, S., 2015. Demulsification of Crude Oil-in-Water Emulsions Driven by Graphene Oxide Nanosheets, Energy and Fuels 29, 4644-4653—incorporated herein by reference in its entirety. By altering or decreasing this cohesive force or tampering with the solid/liquid like layer at the oil/water interface, a stable emulsion can be destabilized. Following the addition of POFA to the W/O emulsion (FIG. 10-b), the POFA homogeneously disperses in the oil phase after vigorous agitation (FIG. 10-c) which triggers the water/oil interface to make contact with the molecules of asphaltenes and resins. Due to strong interactions between POFA and asphaltenes/resins (FIG. 10-d), the shielding layer is slightly broken with the aid of collision between crude oil and water, generating a non-continuous protective film at the water/oil interface. The partially broken protective layer, therefore, acts as a seed for the coalescence of small crude oil droplets to form large ones floating at the top while water molecules settling at the bottom (FIG. 10-e). With the increasing aggregation and coalescence, oil droplets are formed on top while POFA particles settle with the water phase at the bottom (FIG. 10-f). Hence, POFA acts to replace the natural emulsifiers (asphaltenes and resins) leading to instability of the water/oil interfacial film.

Figure 11:
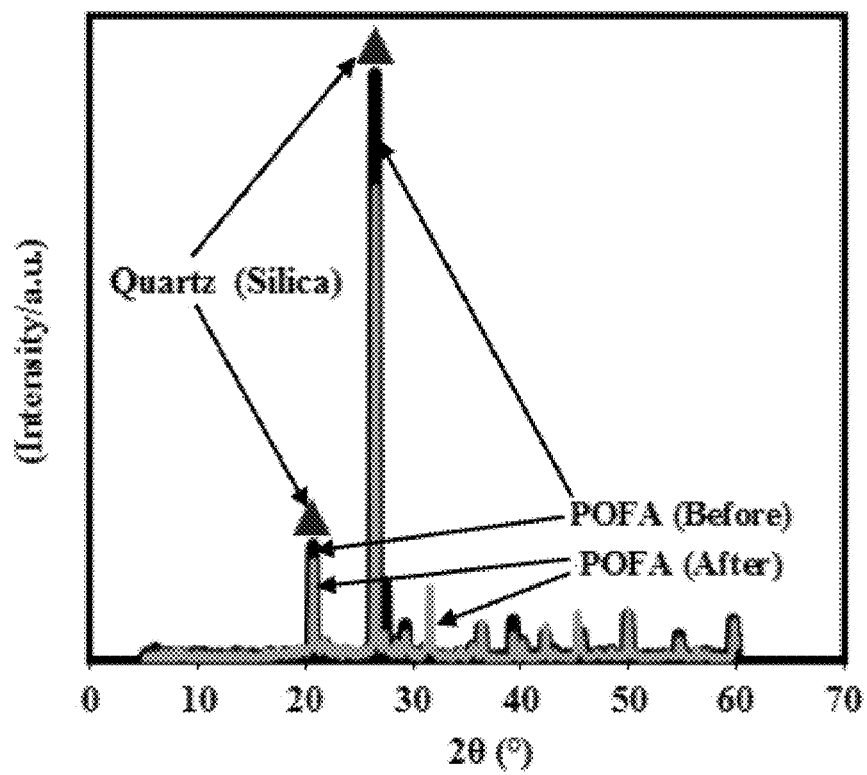
FIG. 11 illustrates the XRD of POFA before and after demulsification.

Furthermore, previous studies have demonstrated that membranes or magnetic particles coated with silica have great propensity to remove water from crude oil emulsions. See Chen, Y., Liu, N., Cao, Y., Lin, X., Xu, L., Zhang, W., Wei, Y., Feng, L., 2016, Fabrication of Silica Nanospheres Coated Membranes: Towards the Effective Separation of Oil-in-Water Emulsion in Extremely Acidic and Concentrated Salty Environments, Nat. Publ. Gr. 1-8; Lü, T., Zhang, S., Qi, D., Zhang, D., Zhao, H., 2016, Thermosensitive poly (N-isopropylacrylamide)-grafted magnetic nanoparticles for efficient treatment of emulsified oily wastewater, J. Alloys Compd. 688, 513-520; and Zhang, S., Lü, T., Qi, D., Cao, Z., Zhang, D., Zhao, H., 2017, Synthesis of quaternized chitosan-coated magnetic nanoparticles for oil-water separation, Mater. Lett. 191, 128-131—each incorporated herein by reference in their entirety. This assertion triggered an analysis of the XRD patterns of the silica peaks in POFA before and after the demulsification test as illustrated in FIG. 11. Accordingly, the peaks found at angles 20 and 26 degrees are ascribed to silica abundance (Saharudin, K. A., Sreekantan, S., Basiron, N., Chun, L. K., Kumaravel, V., Abdullah, T. K., Ahmad, Z. A., 2018, Improved super-hydrophobicity of eco-friendly coating from palm oil fuel ash (POFA) waste, Surf. Coatings Technol. 337, 126-135; Zeyad, A. M., Megat Johari, M. A., Tayeh, B. A., Yusuf, M. O., 2017, Pozzolanic reactivity of ultrafine palm oil fuel ash waste on strength and durability performances of high strength concrete, J. Clean. Prod. 144, 511-522—each incorporated herein by reference in its entirety). The intensities of both peaks at both angles are observed to reduce considerably after demulsification. Silica among other chemical oxides in POFA is believed to play a major role in the breaking of water-crude oil emulsions and thus subsequent separation of water and oil.

Figure 12:
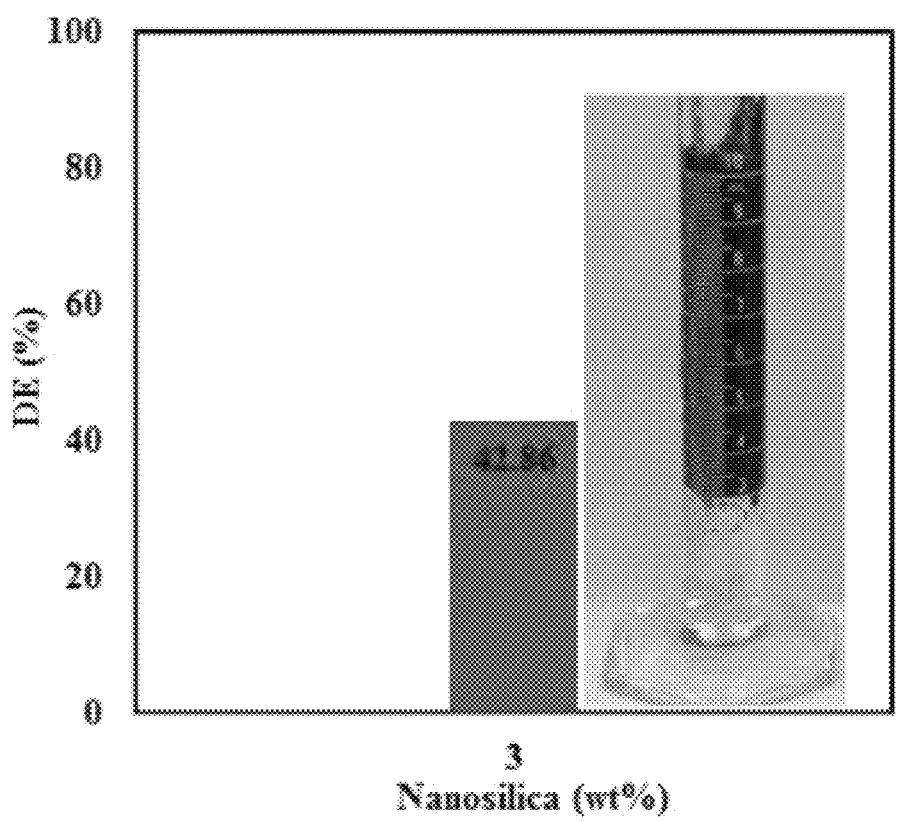
FIG. 12 illustrates demulsification efficiency using nano-silica as a comparative to elucidate the mechanism of POFA as a demulsifier.

To further ascertain the impact of silica found in POFA on the demulsification process, a 3 wt % commercial nanosilica powder was applied to destabilize the same W/O emulsion. A 3 wt % nanosilica was used since 3 wt % POFA produced the best water removal from the formulated emulsions. FIG. 12 depicts the water and oil phases after the introduction of nanosilica powder and agitation. The demulisification capacity of nanosilica at 3 wt % to remove water from the emulsion was found to be approximately 43%. This result shows that POFA performed better than nanosilica in destabilizing crude oil emulsion. Unlike the POFA which settles at the bottom of the water phase allowing easy separation from the crude oil, nanosilica faced the challenge of suspending in the crude oil after separation which will increase production and operational cost. It is necessary to point out that W/O emulsions stabilized by conventional surfactants containing more or fewer asphaltenes and resins can still undergo destabilization upon the inclusion of POFA and subsequent agitation. More importantly, a good understanding of asphaltenes chemistry plays a key role during emulsification and demulsification of crude oil emulsions.

Therefore, palm oil fuel ash (POFA), an environmental waste material, has been found to be capable of collapsing emulsifying substances in the crude oil emulsions produced in the petroleum industry. It is believed that this is the first report on POFA as a demulsification material for effective water removal from crude oil emulsions. It has been shown that low dosages, such as 3 wt. % of POFA provide efficient oil/water separation, which efficiently competes with commercial (and expensive) demulsifiers. Therefore, POFA—a waste product—can easily replace commercial demulsifiers. The mechanism most likely involves adhesion to the acidic oxides of POFA that causes the natural emulsifiers to adhere and thus to be extracted from the interfacial films that stabilize water-crude oil emulsions. The principal oxide of POFA, $SiO_2$, can act as a demulsifier to some degree, although not nearly as efficiently as POFA. The use of $SiO_2$ alone also suffers the drawback of not being easily removable from the oil phase, in stark contrast to POFA, which is far separated from the oil phase and can be easily removed.

The invention claimed is:
1. A method of demulsifying an emulsion comprising oil and water, the method comprising:
adding calcined palm oil fuel ash to the emulsion in an amount of 0.1 to 4 wt. %, based on a total weight of the emulsion; and agitating thereby breaking the emulsion into an aqueous phase and an oil phase, wherein the calcined palm oil fuel ash comprises at least 98.75 wt % of $SiO_2$, $Al_2O_3$, $Fe_2O_3$, CaO, MgO, $K_2O$, $SO_3$, and $Na_2O$ based on a total weight of the calcined palm oil fuel ash.

2. The method of claim 1, wherein the calcined palm oil fuel ash is obtained by drying raw palm oil fuel ash at 80 to 120° C., mechanically ball milling at 140 to 220 rpm, and calcining at 500 to 600° C.

3. The method of claim 1, wherein the calcined palm oil fuel ash has a bimodal particle size distribution with a first mode particle size of 2 to 4 μm and second mode particle size of 20 to 30 μm.

4. The method of claim 1, wherein the calcined palm oil fuel ash comprises, as constituent oxides, 66 to 72 wt. % $SiO_2$, 4 to 8 wt. % $Al_2O_3$, 3 to 7 wt. % $Fe_2O_3$, 3 to 8 wt. % CaO, 1 to 5 wt. % MgO, 3 to 7 wt. % $K_2O$, 0.2 to 0.5 wt. % $SO_3$, and 0.1 to 0.25 wt. % $Na_2O$, each based on a total weight of the palm oil fuel ash.

5. The method of claim 1, wherein the calcined palm oil fuel ash comprises, as constituent oxides, 66 to 68 wt. % $SiO_2$, 6 to 7 wt. % $Al_2O_3$, 5 to 6.5 wt. % $Fe_2O_3$, 5 to 6 wt. % CaO, 2.5 to 3.5 wt. % MgO, 4.5 to 6 wt. % $K_2O$, 0.3 to 0.35 wt. % $SO_3$, and 0.18 to 0.2 wt. % $Na_2O$, each based on a total weight of the palm oil fuel ash.

6. The method of claim 1, wherein the calcined palm oil fuel ash is the only demulsifier employed.

7. The method of claim 1, wherein the emulsion is a water-in-oil (w/o) emulsion.

8. The method of claim 1, wherein the emulsion has a volume ratio of oil to water of 2:8 to 4:6.

9. The method of claim 1, wherein the oil is crude oil.

10. The method of claim 9, wherein the crude oil comprises 40 to 60 wt. % aromatics, 25 to 50 wt. % saturates, 5 to 18 wt. % resins, and 1 to 5 wt. % asphaltenes, each based on a total weight of the crude oil.

11. The method of claim 9, wherein the crude oil has an API gravity of 28 to 35,
a density of 0.8 to 0.94 g/cm³, and
a viscosity of 9 to 13 mPa·s, each measured at 15° C.

12. The method of claim 1, wherein the water is salt water having a total dissolved solids content of 10,000 to 100,000 mg/L.

13. The method of claim 1, wherein the oil is crude oil and the emulsion is obtained from a well in a subterranean geological formation.

14. The method of claim 13, wherein the palm oil fuel ash is added to the emulsion downstream of the well and upstream of a storage tank or a separation unit.

15. The method of claim 1, wherein the emulsion has a temperature of 20 to 90° C.

16. The method of claim 1, which achieves a demulsification efficiency (DE), defined as a volume (V) of the aqueous phase separated from the oil phase divided by an initial volume of water present in the emulsion ($V_o$) multiplied by 100, of 85 to 99.9%.

17. The method of claim 1, further comprising separating the aqueous phase from the oil phase to provide an oil phase which is substantially free of water.

18. The method of claim 1, wherein, after breaking the emulsion, the calcined palm oil fuel ash settles to the bottom of the aqueous phase as settled solid particles, and the method further comprises separating the settled solid particles of palm oil fuel ash from the aqueous phase.

19. The method of claim 1, wherein the calcined palm oil fuel ash does not comprise unoxidized carbon.

\* \* \* \* \*